(12) United States Patent
Yano et al.

(10) Patent No.: US 6,903,273 B2
(45) Date of Patent: Jun. 7, 2005

(54) ELECTRONIC DEVICE AND INFORMATION REPRODUCING SYSTEM

(75) Inventors: Kazuyoshi Yano, Tokyo (JP); Keiko Yabuki, Tokyo (JP); Takaaki Hashimoto, Tokyo (JP)

(73) Assignee: Sony Corporation, Tokyo (JP)

(*) Notice: Subject to any disclaimer, the term of this patent is extended or adjusted under 35 U.S.C. 154(b) by 114 days.

(21) Appl. No.: 10/276,931

(22) PCT Filed: Mar. 22, 2002

(86) PCT No.: PCT/JP02/02793
§ 371 (c)(1),
(2), (4) Date: May 19, 2003

(87) PCT Pub. No.: WO02/078415
PCT Pub. Date: Oct. 3, 2002

(65) Prior Publication Data
US 2003/0188883 A1 Oct. 9, 2003

(51) Int. Cl.[7] .................................................. H02G 3/14
(52) U.S. Cl. ............................ 174/66; 174/67; 220/241
(58) Field of Search ..................... 174/66, 67; 220/241, 220/242; D8/353; D13/177; 439/135; 33/528

(56) References Cited

U.S. PATENT DOCUMENTS 4,979,787 A * 12/1990 Lichtenberger .............. 385/88
5,535,097 A * 7/1996 Ruben et al. ................ 361/736
6,314,483 B1 * 11/2001 Goto et al. .................. 710/107
6,512,178 B2 * 1/2003 Goodman ..................... 174/66
6,646,202 B2 * 11/2003 Garvin et al. ................. 174/66
6,765,149 B1 * 7/2004 Ku ............................... 174/66
6,852,929 B2 * 2/2005 Scudder ....................... 174/66

* cited by examiner

*Primary Examiner*—Dhiru R. Patel
(74) *Attorney, Agent, or Firm*—Jay H. Maioli

(57) ABSTRACT

An electronic device includes a cabinet containing an electronic circuit; a covering member containing wire rods connected to the electronic circuit and led to the outside through an opening of the cabinet; a pivoting convex portion provided in one of the covering member and the cabinet; and a pivoting concave portion provided in the other of the covering member and the cabinet supports the pivoting convex portions, wherein the covering member is pivotally supported with respect to the cabinet. A pivot-supporting unit is provided in a connection cable, whereby pivoting the connection cable through the pivoting unit allows the lead-out direction of the connection cable from an opening of the cabinet to the outside to be selectively changed between a direction in which the connection cable is led downward from the lower surface of the cabinet and a direction sideways intersecting therewith.

6 Claims, 29 Drawing Sheets

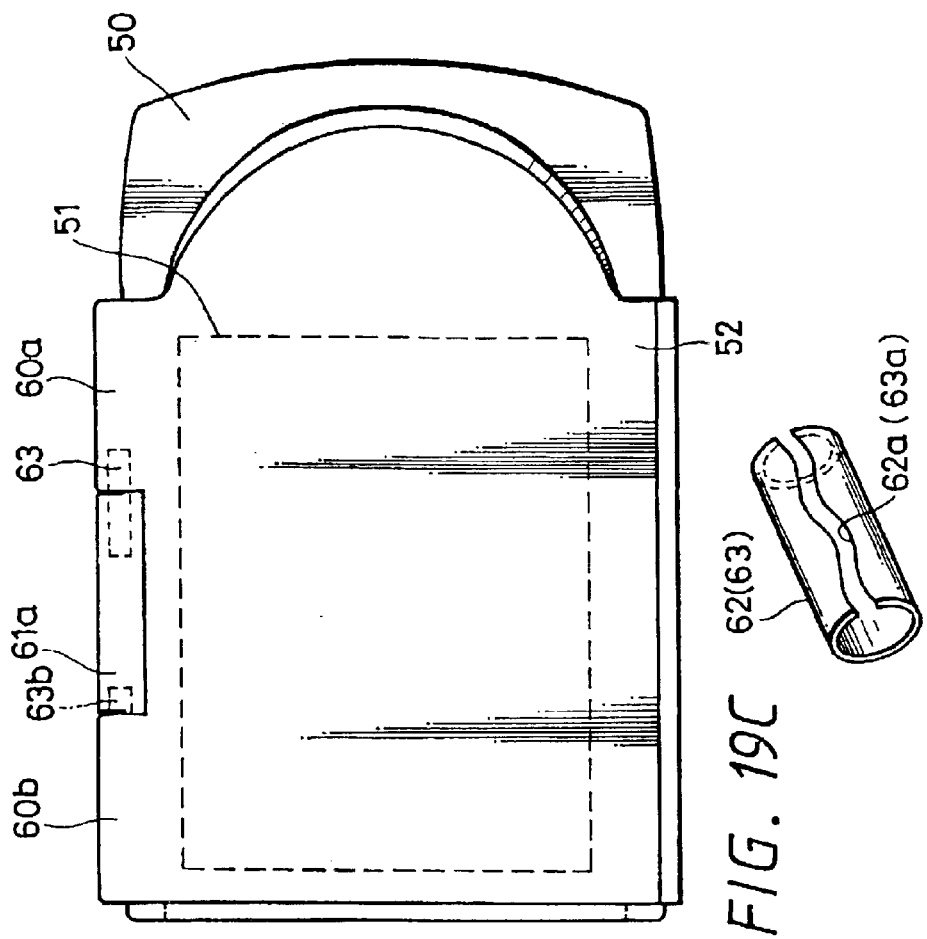
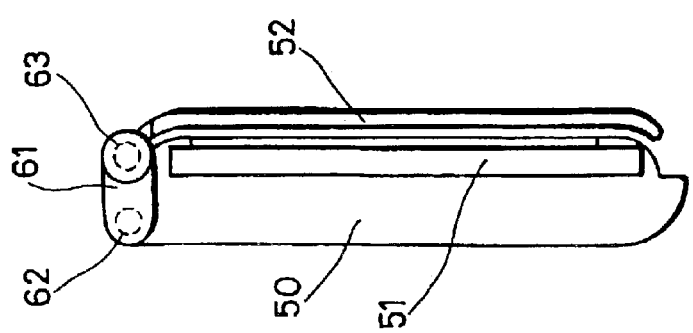
FIG. 19A
FIG. 19B
FIG. 19C

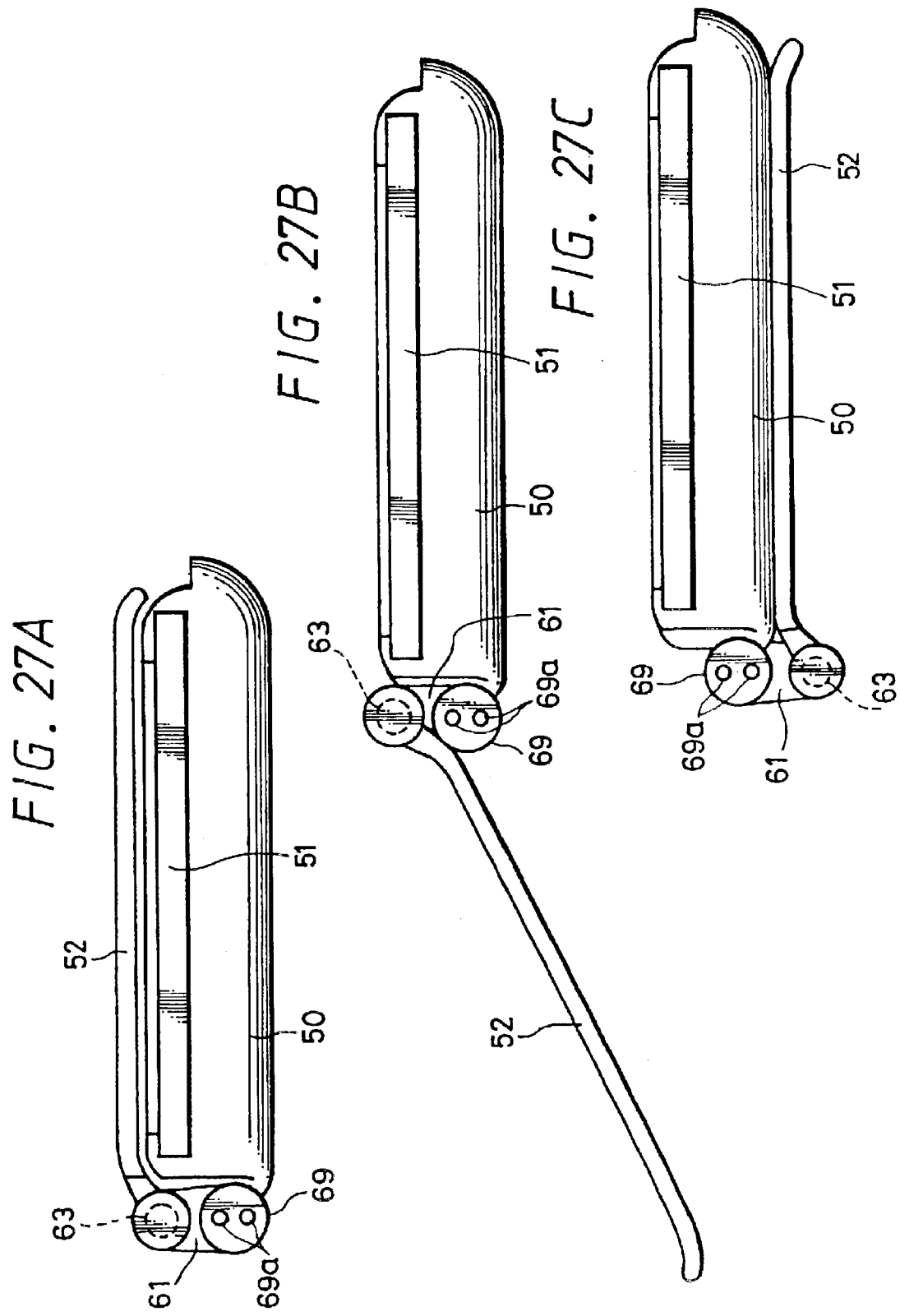

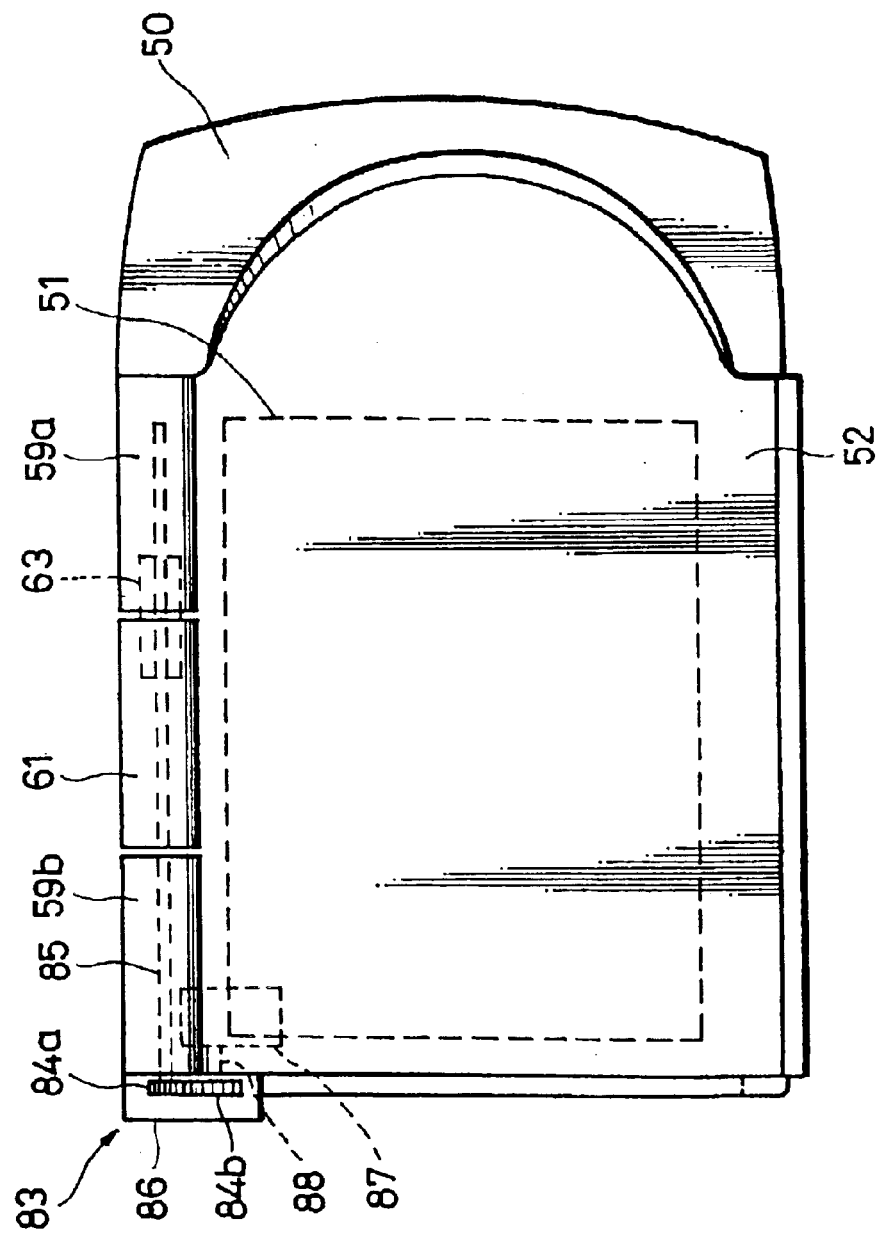
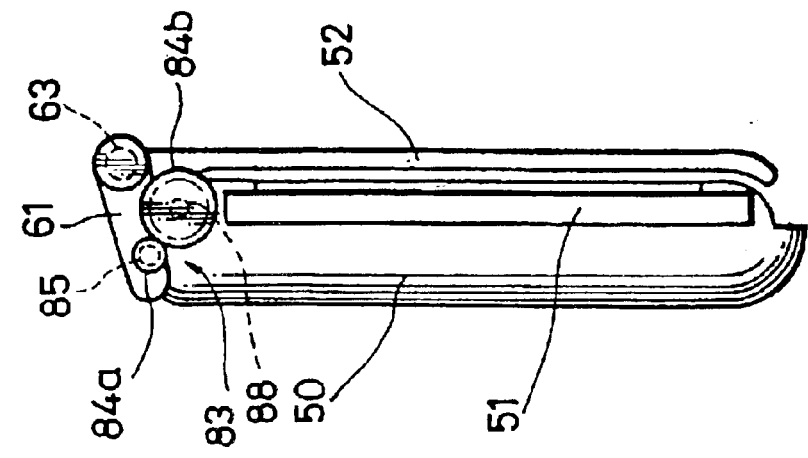

ELECTRONIC DEVICE AND INFORMATION REPRODUCING SYSTEM

TECHNICAL FIELD

The present invention relates to an electronic device in which wire rods connected to an electronic circuit are led outside through an opening of a housing, and by pivoting a covering member containing the wire rods and a pivoting unit provided in the housing, a lead-out direction of the covering member with respect to the housing can be changed; and an information reproduction system provided with the electronic device.

BACKGROUND ART

Conventionally, there have been generally provided an electronic device comprising an information reproducing device which reproduces and outputs information recorded on a disc-type storage medium, a control device which displays information on a screen of a display unit, based on a signal reproduced by the information reproducing device, and the electronic device in which the control device and the information reproducing device are connected by a connecting cable wire to be used.

As such an electronic device, for example, an electronic device comprising a DVD player as an information reproducing device, a television set as a control device provided with a cathode-ray tube as a display unit, and a connection cable for electrically connecting the television set and the DVD player may be listed.

In the above example, the television set has been sufficiently large, and the DVD player has also been comparatively large as an electronic device. Accordingly, these television set and the DVD player have been fixed indoors to be used, and there has been no idea of using the above devices for outdoor amusement.

As a conventional support structure of a connection cable in such an electronic device, a support structure, for example, shown in FIG. 35 has been widely known. In FIG. 35, a reference numeral 200 represents a connection cable led out from the housing of a control device. The connection cable 200 comprises: a number of wire rods 202 connected to an electronic circuit contained in a housing 201; a pipe-like covering member 203 which contains a number of wire rods 202; and support bodies 204 fixed at both ends of the covering member 203 in the longitudinal direction.

The support body 204 is provided to support one end of the connection cable 200 by fixing the above end at the housing 201. On the outer circumferential surface of the support body 204, two ring-shaped convex portions 204a and 204b are formed by providing an annular groove 205 extending in the circumferential direction. A through hole 206 engaged with the support body 204 is provided in one corner of the lower part of the housing 201.

At the inside of the corner of the housing 201, there is provided a wall portion 207 which fixes the support body 204 to the housing 201 by holding the ring-shaped convex portion 204b of the support body 204. By holding the ring-shaped convex portion 204b with the wall portion 207 and the side surface portion of the housing 201, the connection cable 200 is fixed and supported by the housing 201.

Also, a method without providing the above-described wall portion 207, in which the connection cable 200 is fixed by holding the side surface portion of the housing only with one pair of ring-shaped convex portions 204a and 204b of the support body 204, has been generally used.

Such conventional electronic devices, however, had a structure in which the connection cable 200 is fixed and supported with the support body 204 being held by the side surface portion and the wall portion 207 of the housing 201, or with the side surface portion of the housing 201 being held by one pair of ring-shaped convex portions 204a and 204b of the support body 204. Therefore, there has been a problem that the lead-out direction of the connection cable 200 led outside from the housing 201 was fixed in one direction, and the lead-out direction was not freely changed by the user according to a state of use.

DISCLOSURE OF INVENTION

Considering the above circumstances, the present invention proposes: an electronic device in which a pivoting unit is provided in a supporting unit of a connection cable supported by a housing, and the lead-out direction of the connection cable may be changed by pivoting the pivoting unit to lead out the connection cable in an arbitrary direction according to a state of use regarding the electronic device; and an information reproduction system in which the above electronic device and an information reproducing device are electrically connected with wire rods.

In order to solve the above-described problems and the like, and to achieve the above-described object, an electronic device according to the present application comprises: a housing in which an electronic circuit is contained; a covering member containing wire rods which are connected to the electronic circuit and led outside through an opening of the housing; a pivoting convex portion provided in one of the covering member and the housing; and a pivoting concave portion which is provided in the other of the covering member and the housing, and supports the pivoting convex portions, wherein the covering member is pivotally supported with respect to the housing.

Further, an information reproduction system according to the present application comprises: an electronic device which includes a housing containing an electronic circuit, a covering member containing wire rods which are connected to the electronic circuit and led outside through an opening of the housing, a pivoting convex portion provided in one of the covering member and the housing, and a pivoting concave portion which is provided in the other of the covering member and the housing, and supports the pivoting convex portion; and an information reproducing device which is connected to the electronic device through the wire rods, wherein the covering member is pivotally supported with respect to the housing.

According to the above-described configuration, in the electronic device of the present application the lead-out direction in which the connection cable is led out from the housing to the outside may be changed by pivoting the pivoting unit which comprises the pivoting convex portion and the pivoting concave portion. As a result, the connection cable may be arbitrarily positioned corresponding to a state of use regarding the electronic device, and that is for the benefit of the user.

BRIEF DESCRIPTION OF DRAWINGS

FIG. 19A is a front view of an electronic device according to a first embodiment of the present invention;

FIG. 19B is a side view of the electronic device according to the first embodiment of the present invention;

FIG. 19C is an enlarged perspective view of a spring pin of the electronic device according to the first embodiment of the present invention;

FIG. 27A is a side view of an electronic device according to a fifth embodiment of the present invention, wherein a cover is closed;

FIG. 27B is a side view of the electronic device according to the fifth embodiment of the present invention, wherein the cover is opened at an angle of approximately 180 degrees;

FIG. 27C is a side view of the electronic device according to the fifth embodiment of the present invention, wherein the cover is opened at an angle of 360 degrees and is in contact with the rear surface of the electronic device;

FIG. 28A is a front view of an electronic device according to a sixth embodiment of the present invention, wherein a cover is closed;

FIG. 28B is a side view of the electronic device according to the sixth embodiment of the present invention, wherein the cover is closed;

BEST MODE FOR CARRYING OUT THE INVENTION

Hereinafter, embodiments of the present invention will be described, referring to attached drawings. FIG. 1 to FIG. 34 show embodiments of an information reproduction system including an electronic device according to the present invention, and the system is configured to be a portable DVD player.

Figure 1:
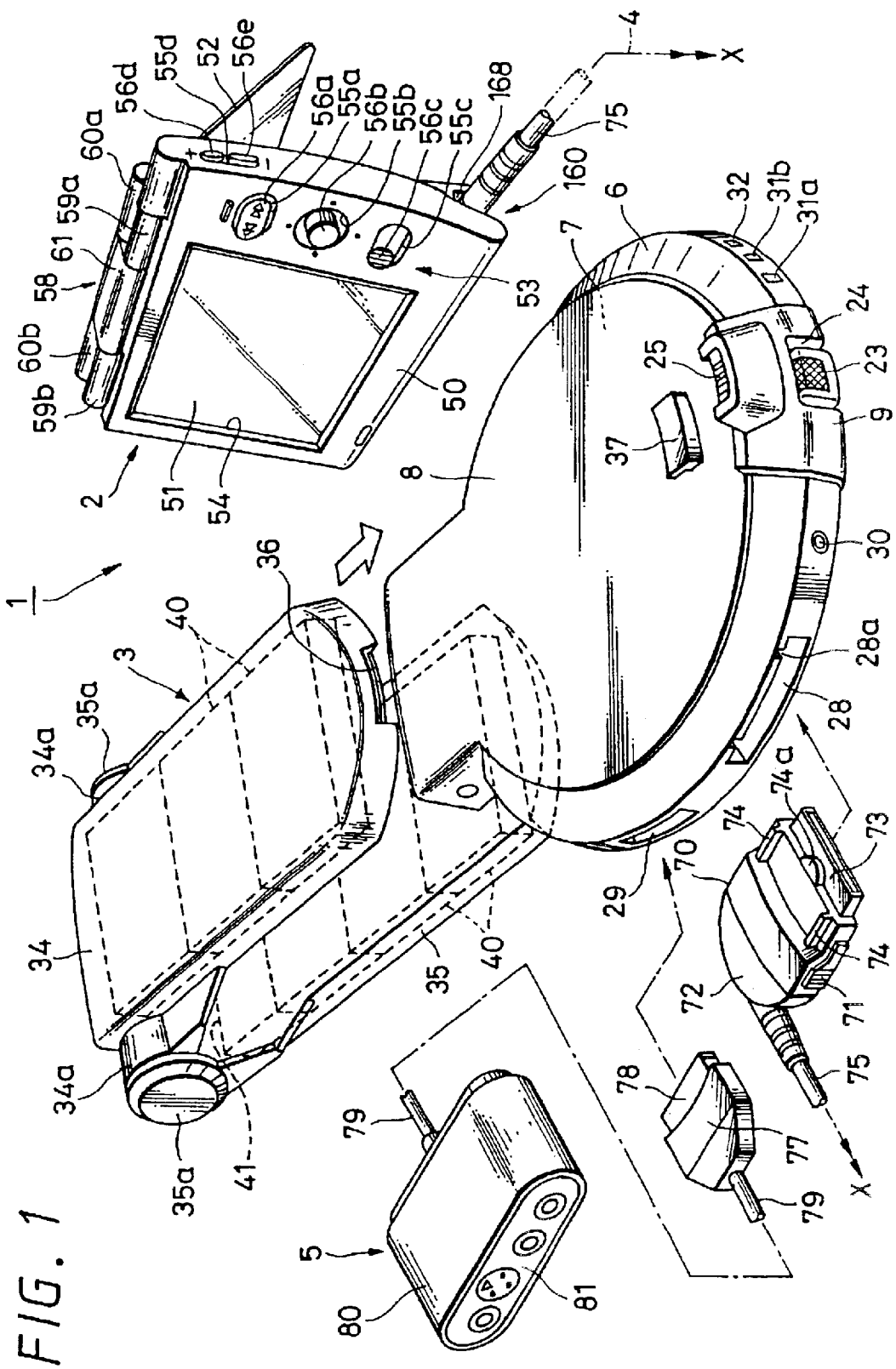
FIG. 1 is a perspective view showing a system configuration of an information reproduction system including an electronic device according to the present invention.

As shown in FIG. 1, the DVD player 1 comprises: a player main unit 6 for DVD (Digital Versatile Disc); a control device 2 which represents one specific example of an electronic device for performing remote control operations of the player main unit 6; and a battery housing 3 which supplies electric power to the control device 2 and the player main unit 6.

The player main unit 6 and the control device 2 are connected through a first connection cable 4 which is signal transmission means. Moreover, the player main unit 6 and other electronic devices (for example, a television set) are connected to each other through a second connection cable 5 which is also signal transmission means.

As shown in FIG. 1 to FIG. 13, the player main unit 6 has a shell-shaped body in which a terrace-type protruding portion 6a is provided at a part of a disc shape body in the circumferential direction. A disc housing unit 7 which comprises a circular recess is provided on the upper surface of the player main unit 6. The disc housing unit 7 is opened and closed with an opening and closing cover 8 which also has a similar shell shape. Further, a buckle 9 which locks the opening and closing cover 8 in a closed state is provided in the player main unit 6.

Figure 10:
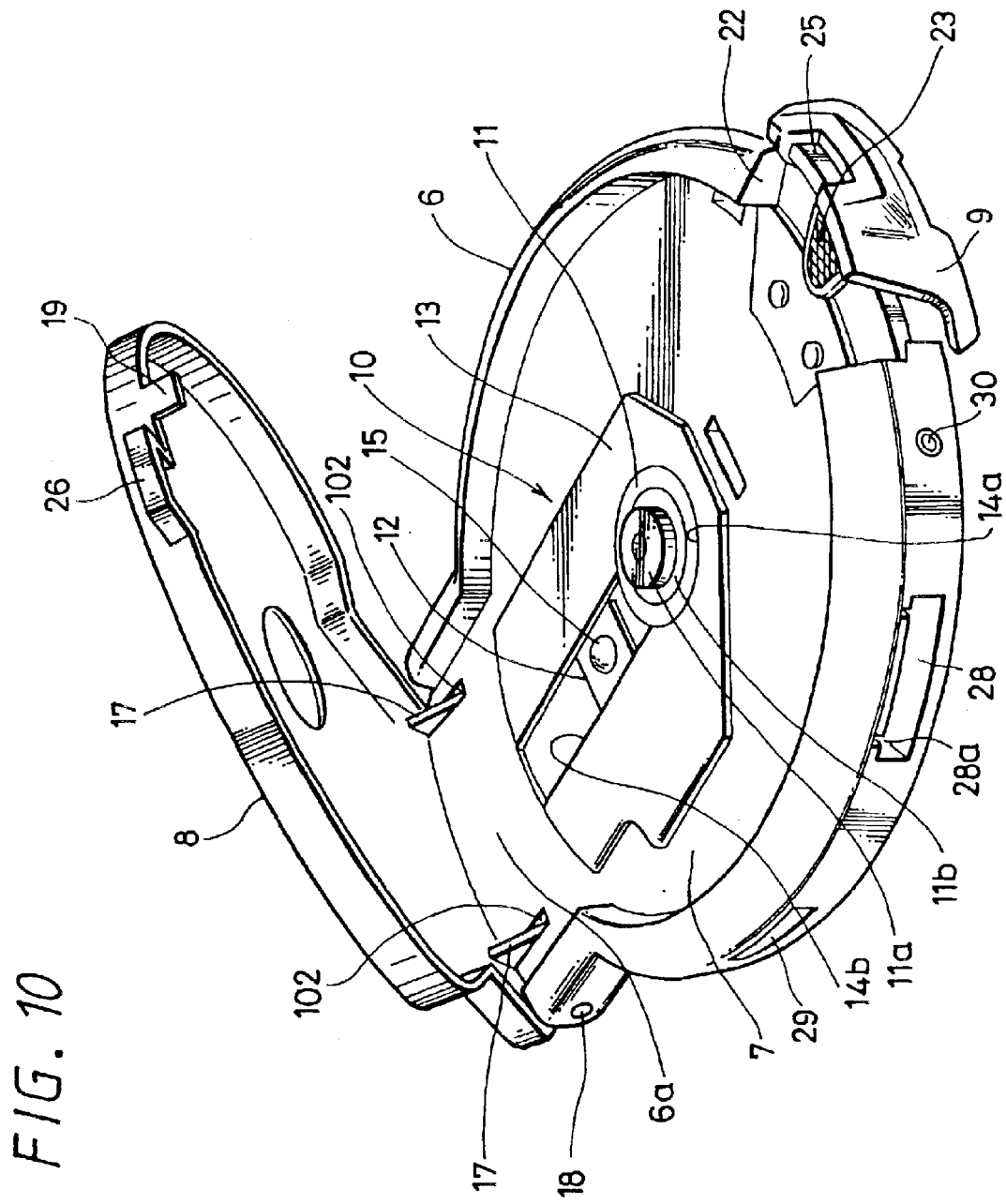
FIG. 10 is a perspective view showing the state in which an opening and closing cover of the player main unit of the DVD player shown in FIG. 2 is open.

As shown in FIG. 10, a disc drive device 10 elastically supported by the player main unit 6 is disposed in the disc housing unit 7 of the player main unit 6. The disc drive device 10 comprises a turntable 11 arranged in the center part of the disc housing unit 7, and an optical pickup device 12 which executes either or both of reproduction (read) and recording (write) of information signals on an information storage surface of an optical disc such as DVD and CD (compact disc) which represent specific examples of a disc-type storage medium installed on the turntable 11.

Though not shown in the drawings, the turntable 11 is fitted on a rotation unit of a spindle motor which is fixed to a housing at the fixed unit. Further, the optical pickup device 12 is slidably supported by a pair of guide shafts which are fixed to the housing. The pair of guide shafts are arranged parallel to each other at a predetermined interval, with their front ends being arranged such that the spindle motor is held thereby, and their rear ends being extended backward.

The upper surface of the disc drive device 10 is covered with a cover plate 13. A circular central hole 14a, and an opening portion 14b in a long-hole shape, which continuously extends backward from the central hole 14a are provided on the cover plate 13. And, the turntable 11 is protruding upward from the central hole 14a, and an optical head of the optical pickup device 12 is inserted into the opening portion 14b. An objective lens 15 of the optical head is provided to face the information storage surface of the disc installed on the turntable 11.

The turntable 11 has an engagement portion 11a engaged with the center hole of the optical disc, and a mounting portion 11b integrally formed with the engagement portion 11a, on which a periphery portion of the central hole of the optical disc is mounted. A plurality of engagement pawls are circumferentially provided approximately at equal intervals in the engagement portion 11a of the turntable 11. Each engagement pawl is constituted to be movable in the radial direction of the mounting portion 11a and is constantly forced outward in the radial direction by springs.

The engagement portion 11a may be engaged with the center hole of the optical disc by moving the engagement pawls backward against the force of the springs. In such an engagement state, each engagement pawl is engaged with and fixed to the periphery of the central hole by the force of the springs. Then, the optical disc is chucked and driven to integrally rotate with the turntable 11.

Figure 11:
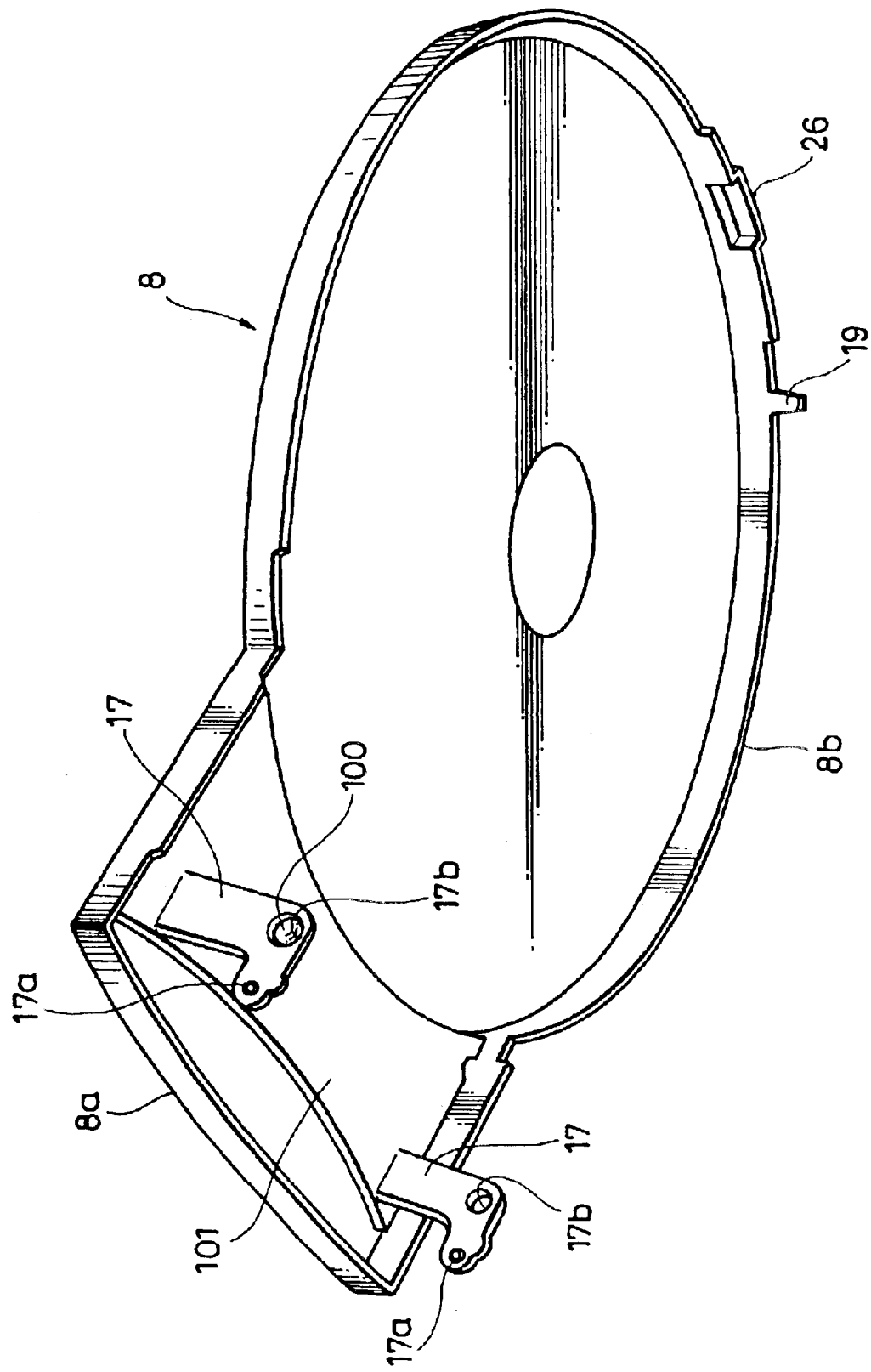
FIG. 11 is a perspective view of the opening and closing cover, which is seen from the lower side, of the DVD player shown in FIG. 2.

As shown in FIG. 11, the opening and closing cover 8 overlapped on the upper surface of the player main unit 6 is comprised of a protruding portion 8a corresponding to the protruding portion 6a of the player main unit 6 and a side surface portion 8b extending downward from the outer periphery of the protruding portion 8a, that is, toward the lower surface side. In addition, a pair of L-shaped arm pieces 17 and 17, which are protruding toward the lower surface side, are provided in the protruding portion 8a of the opening and closing cover 8 shaft receiving holes 17a which provide a pivoting center to the player main unit 6 are provided in the tip ends of each arm piece 17.

Figure 12:
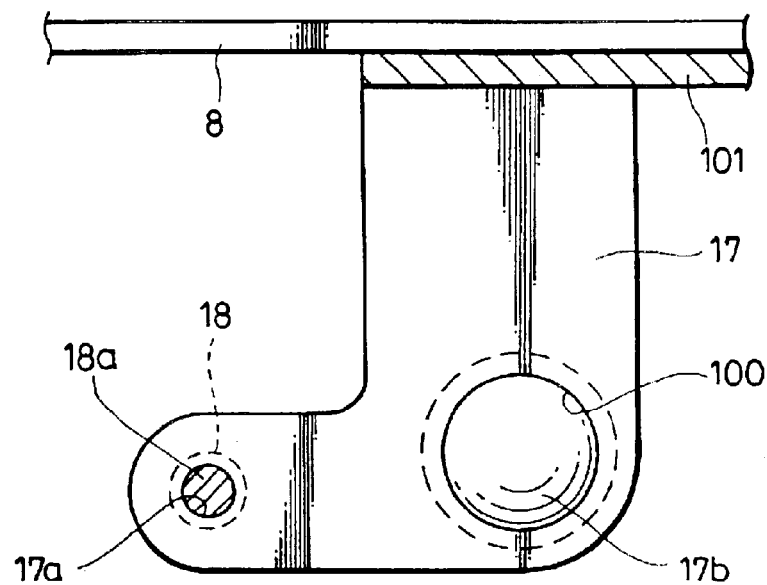
FIG. 12 is an explanatory view of an enlarged arm piece of the opening and closing cover shown in FIG. 11.
Figure 13:
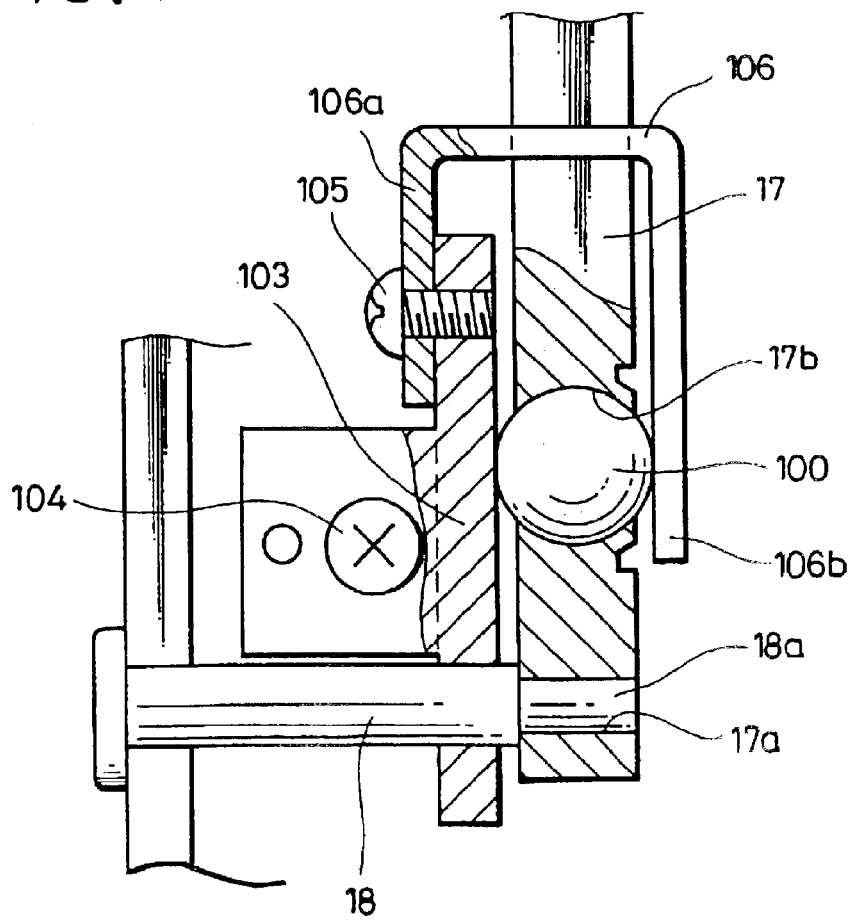
FIG. 13 is an explanatory sectional view of the main parts of a first friction mechanism provided between the opening and closing cover and the player main unit of the DVD player shown in FIG. 2.

Further, through holes 17b are provided in each bent portion of arm pieces 17. As shown in FIGS. 12 and 13, a steel spherical body 100 is engaged and fixed into one of the through holes 17b of the arms 17 by fixing means such as caulking and press fitting, which shows one specific example of a sliding body. The diameter of the spherical body 100 is selected to be slightly larger than the thickness of the arm pieces 17, and to protrude sideways from the both surfaces of the arm piece 17.

The pair of the arm pieces 17 and 17 are formed integrally as connected to each other by a cross-linking plate 101, and, also, to be fixed on the lower surface of the protruding portion 8a. This pair of the arm pieces 17 and 17 are inserted into the inside of the player main unit 6, passing through slit openings 102 and 102 which are provided in the protruding portion 6a of the player main unit 6. Moreover, smaller-diameter shaft portions 18a provided on the ends of a supporting shaft 18 are each engaged and fixed integrally to shaft receiving hole 17a of the arm pieces 17 by the fixing means such as press fitting, respectively. Each supporting shaft 18 is supported by shaft receiving bracket 103. And, the shaft-receiving bracket 103 is fixed to the player main unit 6 by the fixing means such as fixing screws 104.

A pair of the supporting shafts 18 and 18 are inserted into the inside of the player main unit 6 from the sides as opposing to each other. The smaller-diameter shaft portions 18a in the tips of each supporting shaft 18 engage each shaft receiving hole 17a of the arm pieces 17, respectively. The opening and closing cover 8 is pivoted in an up-and-down manner with the pair of the supporting shafts 18 and 18 being a pivot center to open and close the disc housing unit 7.

A leaf spring 106 is fixed with a fixing screw 105 on the shaft-receiving bracket 103. The leaf spring 106 has a U-shape, and the fixing screw 105 passes through a fixed piece 106a which is one part of the U-shape leaf spring. A spring piece 106b of the other part of the U-shape leaf spring 106 is protruding to the other side such that the spherical body 100 is held, and the spring piece 106b is forced to elastically press the outer spherical surface of the spherical body 100. The spherical body 100, the shaft receiving bracket 103, and the leaf spring 106 form a first friction mechanism.

The first friction mechanism is provided to give constant magnitude of friction force between the player main unit 6 and the opening and closing cover 8 such that the opening and closing cover 8 may be opened and closed with a constant strength (frictional force). Specifically, frictional force with a suitable magnitude is generated by the spring force of the leaf spring 106 between the spherical body 100 and the shaft receiving brackets 103, and between the spherical body 100 and the spring piece 106b of the leaf spring 106, and the frictional forces enable the opening and closing cover 8 to constantly move with a predetermined magnitude of force.

With the first friction mechanism provided, the opening and closing cover 8 may be pivoted around a pivoting center at the supporting shafts 18 with a constant magnitude of force regardless of an elevation angle, and the opening and closing cover 8 may also be stopped at an arbitrary opening and closing angle. The disc housing unit 7 is completely closed with the opening and closing cover 8 being pushed down to cover the player main unit 6.

In this case, a cover opening and closing switch which is the first detector is operated by an opening and closing detection piece 19 provided on the opening and closing cover 8, and a state in which the opening and closing cover 8 is closed is detected. The opening and closing detection piece 19 is arranged at the side of the free end of the side surface portion 8b of the opening and closing cover 8 (at the opposite side to the arm pieces 17). Corresponding to the opening and closing detection piece 19, a detection hole 20 for the opening and closing cover 8 is provided on the disc housing unit 7 of the player main unit 6. The cover opening and closing switch is arranged at the inside of the detection hole 20.

Figure 16:
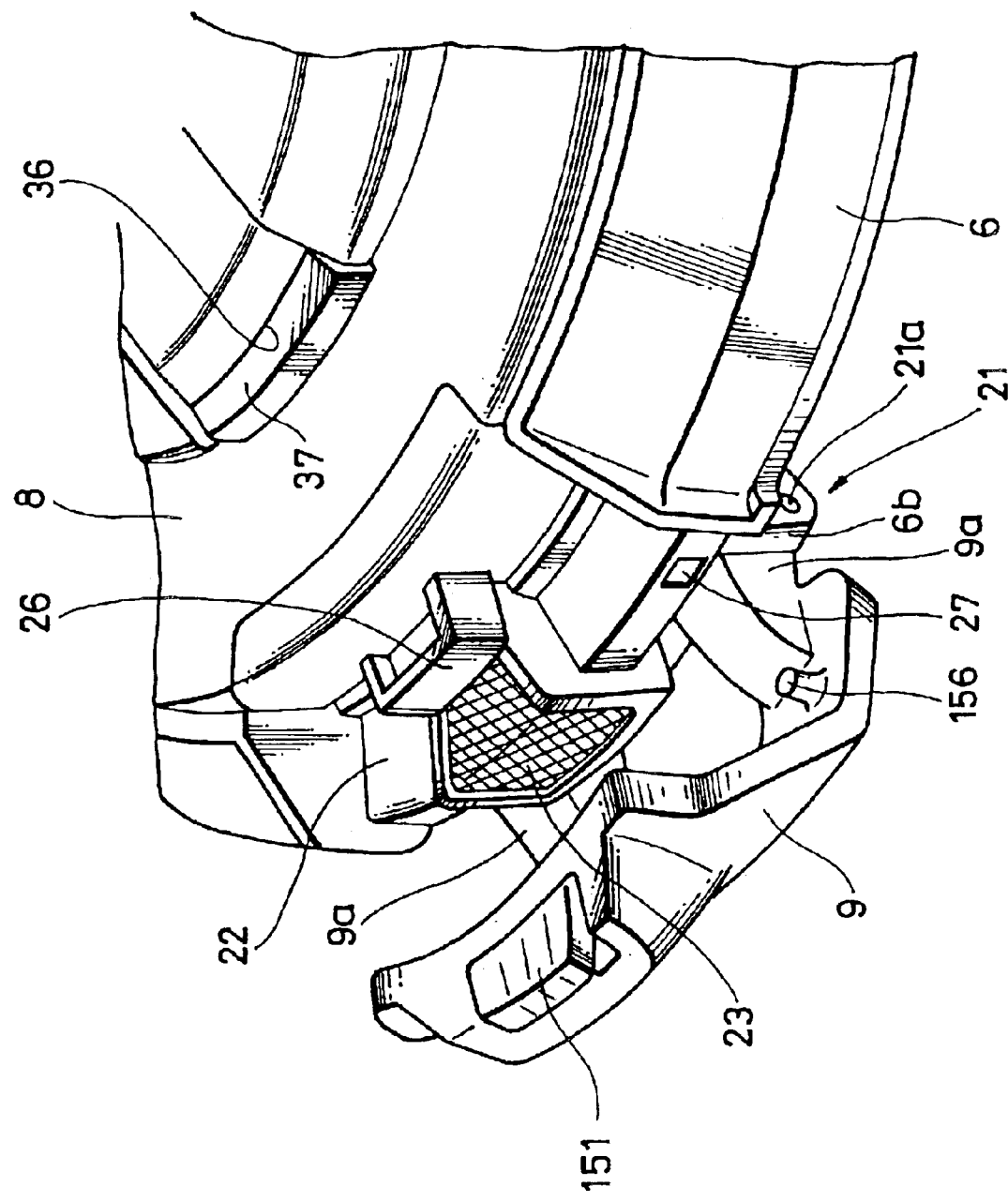
FIG. 16 is a perspective view showing main parts of an enlarged buckle which is seen from the right side of the player main unit shown in FIG. 10.
Figure 17:
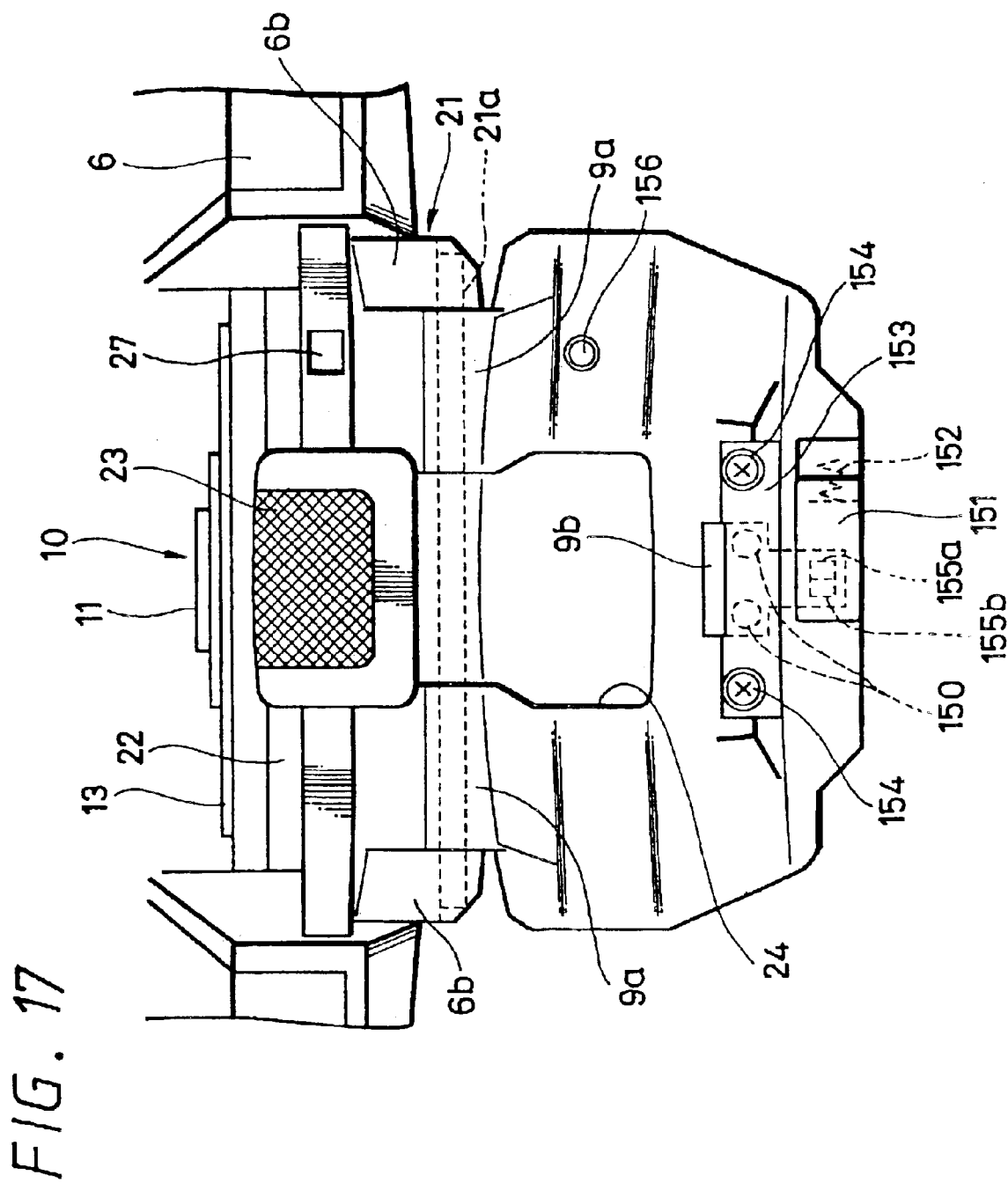
FIG. 17 is a front view of the main parts of the enlarged buckle which is seen from the upper side of the player main unit shown in FIG. 10.

Furthermore, the buckle 9 is pivotally installed on a front surface which is the opposite side to the protruding portion 6a of the player main unit 6. As shown in FIG. 16 and FIG. 17, the buckle 9 has a shape fit for the shape of the side surface of the player main unit 6 such that the buckle 9 is fixed on the side surface thereof, and is joined to the player main unit 6 with a hinge at one side in the width direction perpendicular to the circumferential direction.

That is, shaft receiving portions 9a are provided at one side of the buckle 9 in the width direction, and are inserted between a pair of shaft receiving convex portions 6b and 6b of the player main unit 6. A hinge unit 21 is formed by passing a pivoting shaft 21a through the pair of shaft receiving convex portions 6b and 6b, and the shaft receiving portions 9a. A notch 22, in which the buckle 9 is movably fixed at the side of the free end, is provided on the upper surface of the player main unit 6, which is at the opposite side to the hinge unit 21.

An opening window 24 is provided approximately in the center part of the buckle 9. A beam receiving unit 23 of the remote control device, which will be described later, provided approximately in the center part of the notch 22 of the player main unit 6 is inserted into the opening window 24. The beam receiving unit 23 is constructed to have beam receiving surfaces on two surfaces, that is, the front and upper surfaces of the player main unit 6, and the beam receiving surface at the front side is exposed through the opening window 24.

Furthermore, an engagement body 9b engaging and holding the opening and closing cover 8 is provided in the buckle 9 such that the engagement body 9b can move forward and backward by a forward/backward operation mechanism. The forward/backward operation mechanism comprises: a spring 150 which forces the engagement body 9b to be pressed constantly outward; a sliding member 151 which makes the engagement body 9b move forward and backward against the spring force of the spring 150; a spring member 152 which forces the sliding member 151 to move in the returning direction; a holder 153 which holds the above members; a plurality of fixing screws 154 which fixes the holder 153 to the inside of the buckle 9, and the like. Cam portions 155a and 155b protruding in the directions opposite to each other are provided in the engagement body 9b and the sliding member 151, respectively.

An engagement receiving unit 26 with which the engagement body 9b engages in a detachable manner is provided approximately in the center part at the side of the free end of the opening and closing cover 8, corresponding to the engagement body 9b of the buckle 9. The engagement receiving unit 26 of the opening and closing cover 8 is inserted approximately into the center part of the notch 22 in a state in which the disc housing unit 7 is closed. The tip of the engagement receiving unit 26 and that of the engagement body 9b of the buckle 9 come in contact with each other in a state of the opening and closing cover 8 being overlapped on the player main unit 6. Then, the engagement body 9b is made to move backward against the spring force of the spring 150 by further pushing the buckle 9, and to climb over the tip portion of the engagement receiving unit 26. Subsequently, the opening and closing cover 8 is fastened and locked firmly with the buckle 9 by engaging the engagement body 9b with the engagement receiving unit 26.

Thus, by sliding the sliding member 151 in the rightward direction in FIG. 17 against the spring force of the spring member 152, the cam portion 155b provided in the sliding member 151 makes the cam portion 155a provided in the engagement body 9b move backward. As a result, the engagement body 9b moves backward from the surface of the holder 153 to the inside thereof, and the engagement of the engagement body 9b with the engagement receiving unit 26 of the opening and closing cover 8 is released.

Then, as releasing the sliding member 151, the sliding member 151 slides leftward by the spring force of the spring member 152. With this, the cam portion 155b is separated from the cam portion 155a, thereby the engagement body 9b returning to the original state and protruding by the spring force of the spring 150.

The state in which the opening and closing cover 8 is locked with the buckle 9 can be easily released by the following two aspects of the invention. A first unlocking operation is to slide the sliding member 151 in the circumferential direction. At this time, by sliding the sliding member 151 in the transverse direction, the engagement body 9b moves backward against the spring force of the spring 150. Then, the engagement of the engagement receiving unit 26 with the engagement body 9b is released.

As a result, the buckle 9 can be pulled up, and the engagement body 9b is largely pulled apart from the engagement receiving unit 26 by the pulling-up operation to make the pulling-up operation of the opening and closing cover 8 possible. In such a case, the pulling-up operation of the buckle 9 may be easily and smoothly performed with a small force.

Moreover, a second operation for unlocking a locked state of the opening and closing cover 8 is to directly pull up the buckle 9, omitting the operation of sliding the sliding member 151. In such a case, when the buckle 9 is pulled up, larger pulling-up force than that in the first unlocking operation is required as the spring force of the spring 150, that of the spring member 152 and the movement of the sliding member 151 become a resisting force. However, the pulling-up operation of the buckle 9 may be executed in a comparatively simple manner by adequately setting the magnitude of the spring forces of the spring 150 and the spring member 152.

In order to detect the opening and closing operation of the buckle 9, an opening and closing protrusion 156 is provided at the inside of the buckle 9. A buckle detection hole 27 corresponding to the opening and closing protrusion 156 is provided on the front surface of the notch 22 of the player main unit 6. A buckle opening and closing switch, which is a second detector to detect the opening and closing operation of the buckle 9, is arranged at the inside of the buckle detection hole 27. At this time, with completely installing the buckle 9 and locking the opening and closing cover 8, the opening and closing protrusion 156 is inserted into the buckle detection hole 27. Accordingly, the buckle opening and closing switch is operated by the opening and closing protrusion 156, and the locked state of the buckle 9 is detect.

As shown in FIG. 1 and in other figures, on the side surface of the player main unit 6, there are provided a first socket 28, a second socket 29 and an earphone jack 30; display lamps such as a charge lamp 31a and a power supply lamp 31b; and operation means 32 such as a reproducing button and a volume switch. The first and second sockets 28 and 29, and the earphone jack 30 are disposed on the left side-surface of the player main unit 6, and the display lamps and the operation means 32 are disposed on the right side-surface of the player main unit 6.

Figure 14:
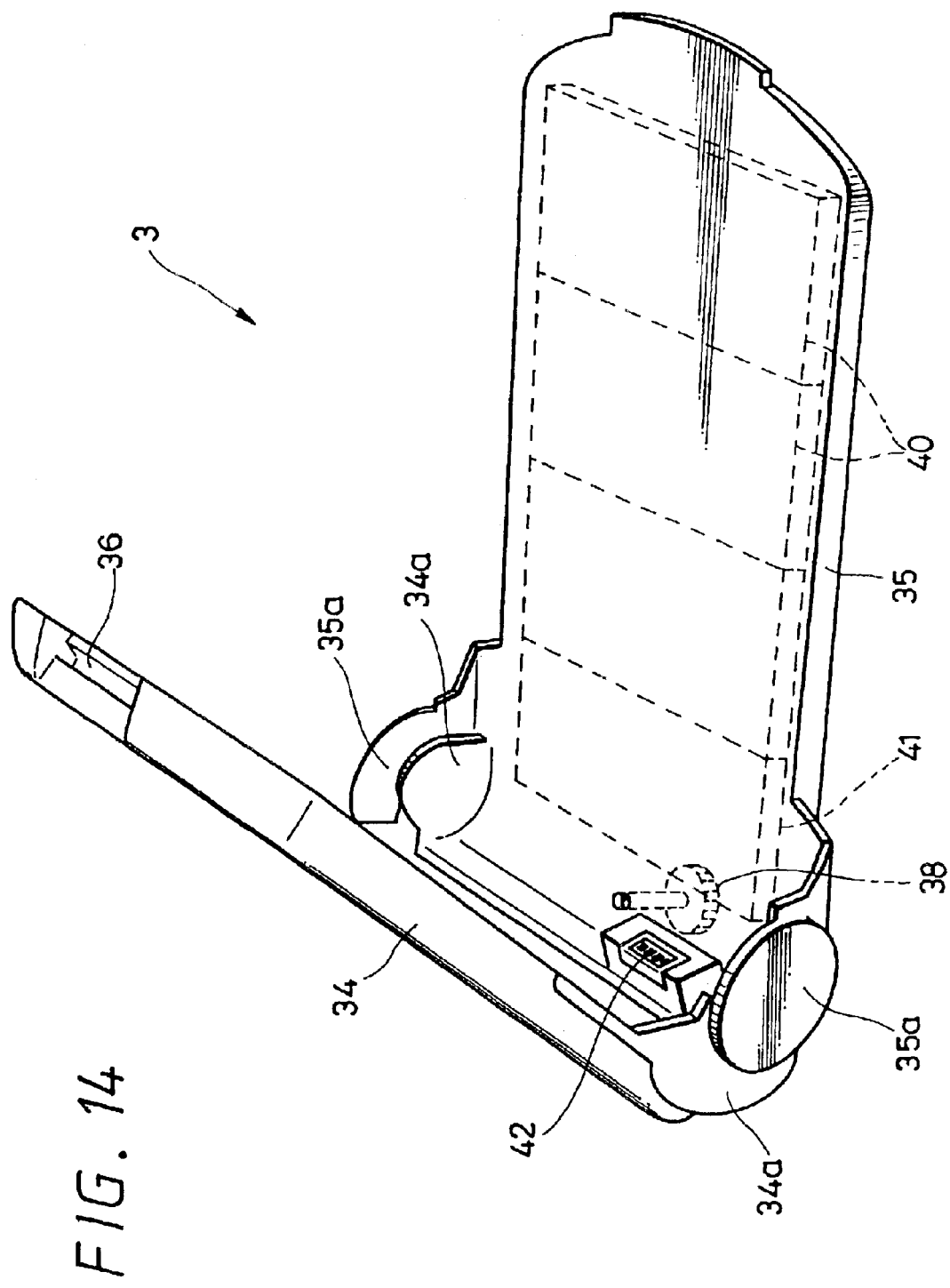
FIG. 14 is a perspective view of the battery housing, which is opened, of the DVD player shown in FIG. 2.

The battery housing 3 for the player main unit 6 having such configuration is installed in a detachable manner as a power supply device. As shown in FIGS. 1, 14 and in other figures, the battery housing 3 comprises a first battery case 34 and a second battery case 35, and the both cases 34 and 35 are pivotally connected to each other.

The battery cases 34 and 35 are comprised of flat holders each in rectangle shape with the plane shapes being approximately similar, and the lower battery case 35 as the second battery case is longer in the longitudinal direction than the upper battery case 34 as the first battery case. Further, the widths of the both battery cases 34 and 35 are slightly wider than those of the protruding portion 6a of the player main unit 6 and the protruding portion 8a of the opening and closing cover 8.

Figure 2:
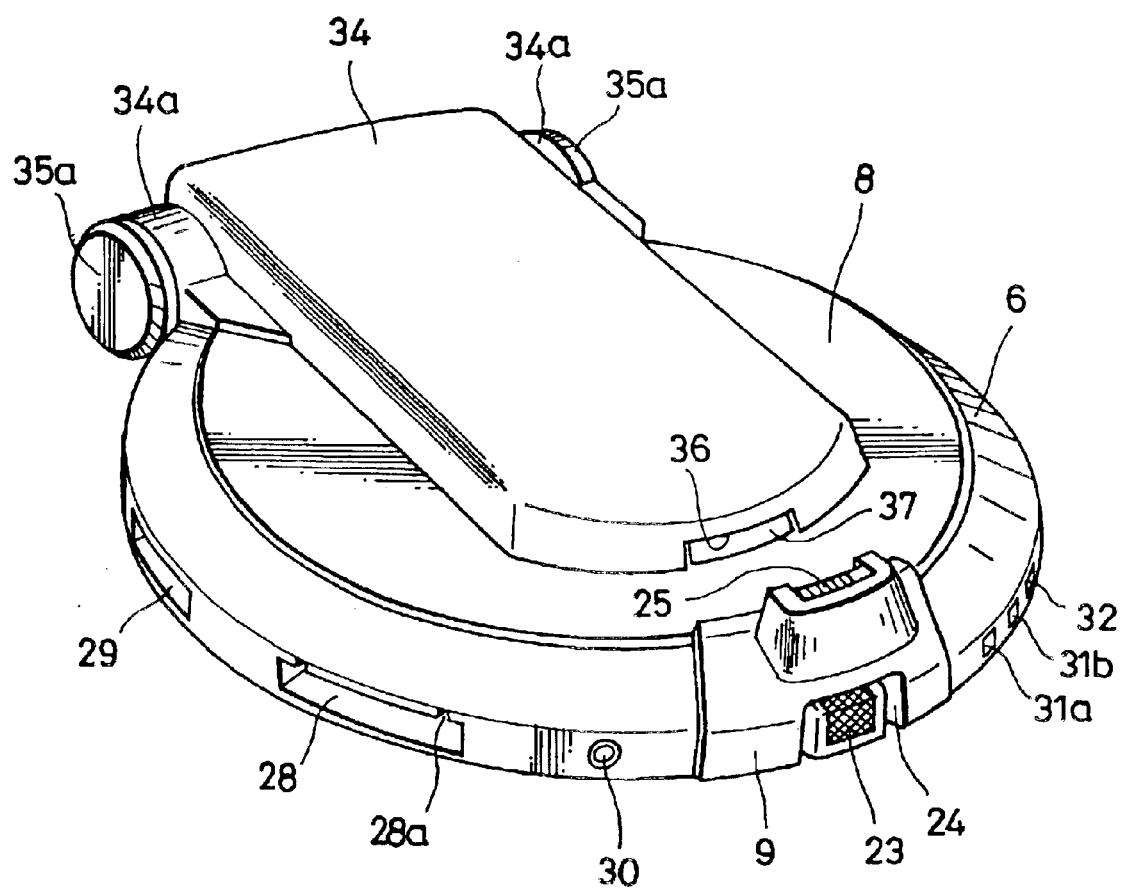
FIG. 2 is an outside perspective view of a DVD player showing one embodiment of an information reproducing device according to the information reproduction system of the present invention.
Figure 3:
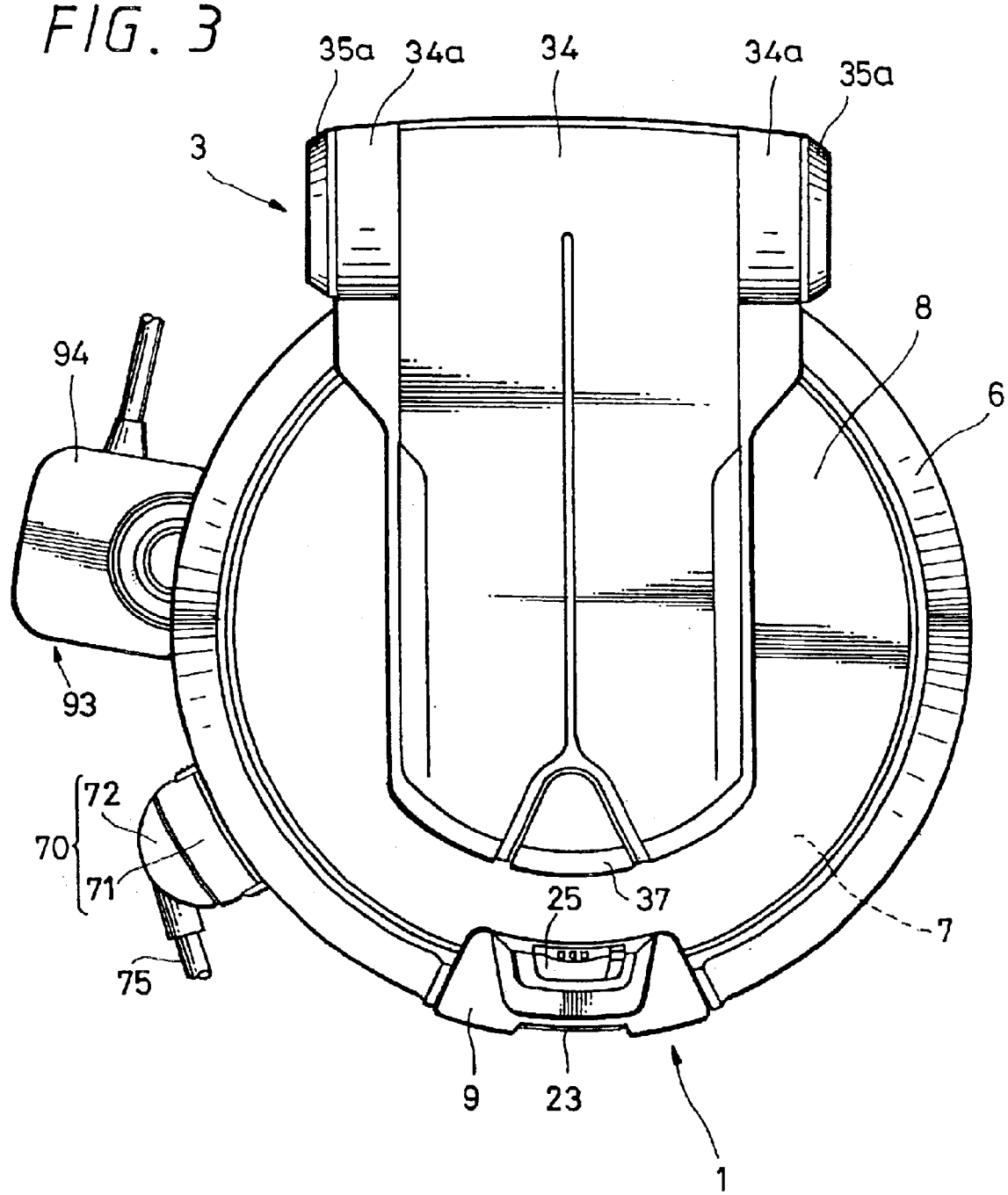
FIG. 3 is a plan view of the DVD player shown in FIG. 2.

As shown in FIG. 2 and in other figures, connection portions 34a and 35a which are outwardly protruding at the both sides in the widthwise direction are provided at the one end of each battery case 34 and 35 in the longitudinal direction. The upper and lower battery cases 34 and 35 are integrally formed by pivotally connecting each of the connection portions 34a and 35a, respectively. The second friction mechanism is provided in the battery housing 3.

Figure 15:
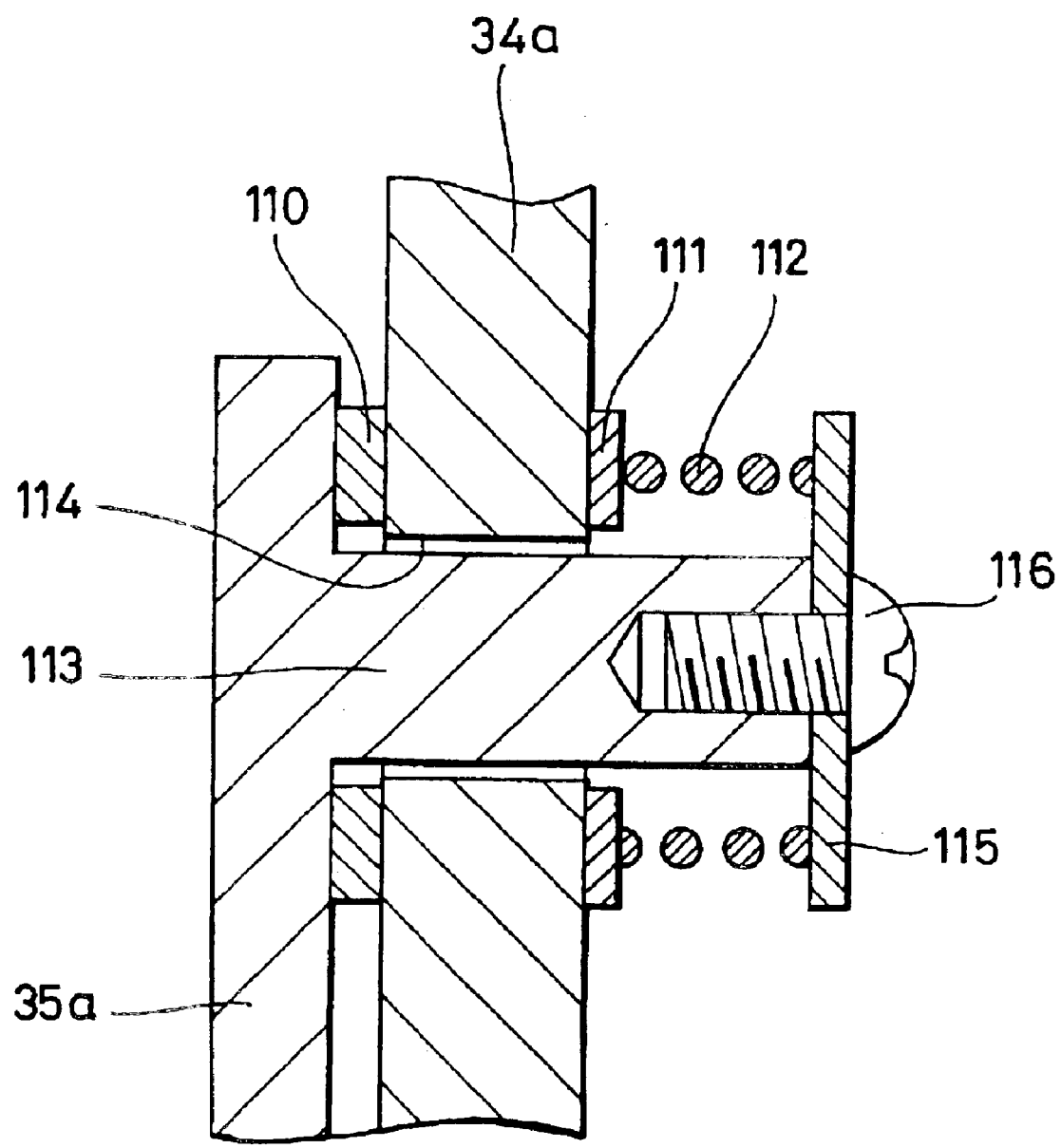
FIG. 15 is an explanatory sectional view of the main parts of a second friction mechanism provided in the battery housing of the DVD player shown in FIG. 2.

As shown in FIG. 15, the second friction mechanism comprises: a friction ring 110 in a ring shape indicating one specific example of a friction plate set between the connection portions 34a and 35a of the upper and lower battery cases 34 and 35; a metal washer 111 which is in contact with the upper connection portion 34a of the upper battery case 34; a spring 112 which presses the lower connection portion 35a of the lower battery case 35 to the friction ring 110; and others. A shaft 113 protruding to the side of the upper connection portion 34a is provided in the lower connection portion 35a, and the plastic friction ring 110 is loosely engaged with the shaft 113.

The shaft 113 is loosely inserted through the through hole 114 provided in the upper connection portion 34a. Further, a screw hole is provided on the surface of the tip of the shaft 113, and a washer 115 is fixed through the screw hole with a fixing screw 116. Also, the above-described metal washer 111 is loosely engaged with the shaft 113 such that the upper connection portion 34a is held between the friction ring 110 and the metal washer 111, and one end of the spring 112 is seated on the metal washer 111. The other end of the springs 112 is seated on the metal washer 115 in a compressed state.

According to the second friction mechanism with such a configuration, by the spring force of the spring 112, one surface of the upper connection unit 34a is pressed into contact with one surface of the friction ring 110, and the lower connection portion 35a is pressed into contact with the other surface of the friction ring 110, and also the metal washer 111 is pressed into contact with the other surface of the upper connection portion 34a. As a result, the frictional force is generated between the upper connection portion 34a and the friction ring 110; and between the upper connection unit 34a and the metal washer 111, and also the frictional force is generated between the lower connection portion 35a and the friction ring 110.

With the above frictional forces, friction is generated on the opening and closing cover 8 being pivotal with respect to the player main unit 6. By suitably setting the magnitude of the friction, the magnitude of the force for opening and closing the battery housing 3 may be preferably set, and the upper battery case 34 housing heavy batteries may be halted at an arbitrary opening and closing angle and that state may be kept.

Thus, the battery housing 3 may be placed in either a closed state in which the upper and lower battery cases 34 and 35 are opened at a predetermined distance approximately being parallel to each other in the vertical direction, or an open state in which the inclined upper battery case 34 is opened at an arbitrary angle (for example, 45 degrees, 60 degrees, and the like) with respect to the lower battery case 35. The distance between the battery cases 34 and 35 in the closed state, in which the upper and lower battery cases 34 and 35 are approximately parallel to each other, represents the thickness of the player main unit 6, and the player main unit 6 is inserted between the upper and lower battery cases 34 and 35.

In order to position the player main unit 6 inserted as described above, an engagement concavo-convex portion 36 is provided at the end of the upper battery case 34. A hook 37 with an L-shape cross section is provided in the opening and closing cover 8, corresponding to the engagement concavo-convex portion 36. The hook 37 is arranged in the neighborhood of the engagement receiving unit 26 on the opening and closing cover 8. By engaging the engagement concavo-convex portion 36 with the hook 37, positioning of the upper battery case 34 with respect to the opening and closing cover 8 and joining of the opening and closing cover 8 to the upper battery case 34 may be simultaneously executed.

Further, a fixing screw 38 is pivotally provided in the lower battery case 35. The fixing screw 38 is arranged at a position corresponding to the protruding portion 6a of the player main unit 6 in the lower battery case 35. A screw hole is provided on the rear surface of the player main unit 6, corresponding to the fixing screw 38, and the lower battery case 35 is fixed to the player main unit 6 by screwing the fixing screw 38 into the screw hole.

In a state in which the lower battery case 35 is fixed, the upper battery case 34 is pivoted integrally with the opening and closing cover 8. That is, the opening and closing cover 8 may freely cover or expose the disc housing unit 7 while the upper battery case 34 is fixed thereto. A suitable number of rechargeable secondary batteries 40 are stored in the upper battery case 34.

Further, an appropriate number of rechargeable secondary batteries 40 and a safety circuit 41 are contained in the lower battery case 35. The safety circuit 41 may detect abnormalities with respect to the electric power such as larger flow of current from the battery housing 3 than that of a rated one, decrease in voltage than a set value, and the like.

In such case, when the safety 41 detects large current or abnormalities in the voltage, it is decided that there are abnormalities in any of the secondary batteries stored in the upper and lower battery cases 34 and 35, and alarm signals are output to take necessary countermeasures such as display of warning, disconnection of the currents or the like. Here, it is preferable that each secondary battery 40 is provided with a thermal fuse so that temperature control and the like are executed for each secondary battery 40.

Figure 4:
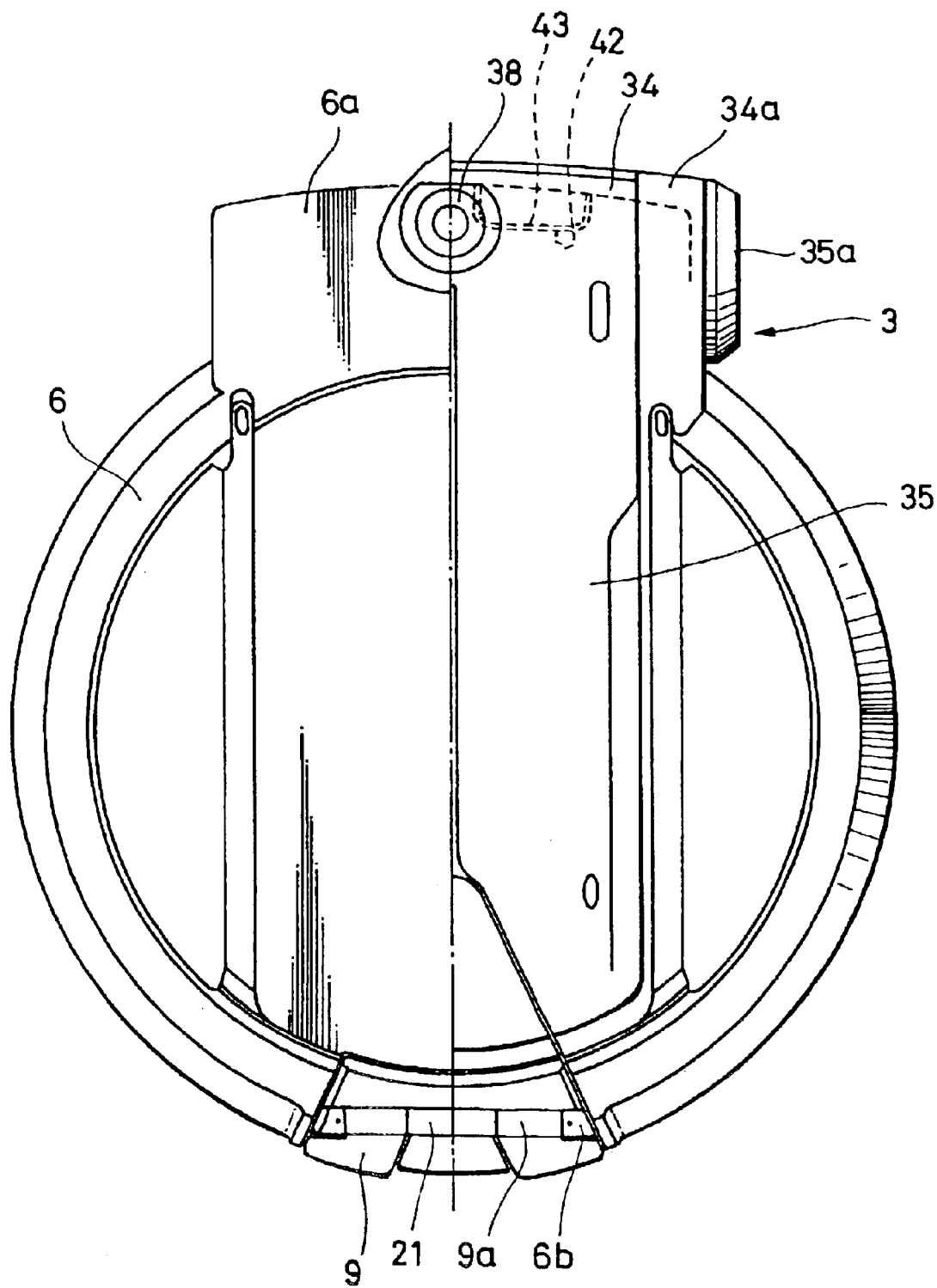
FIG. 4 is a bottom view of a battery housing, which is cut into halves, of the DVD player shown in FIG. 2.
Figure 5:
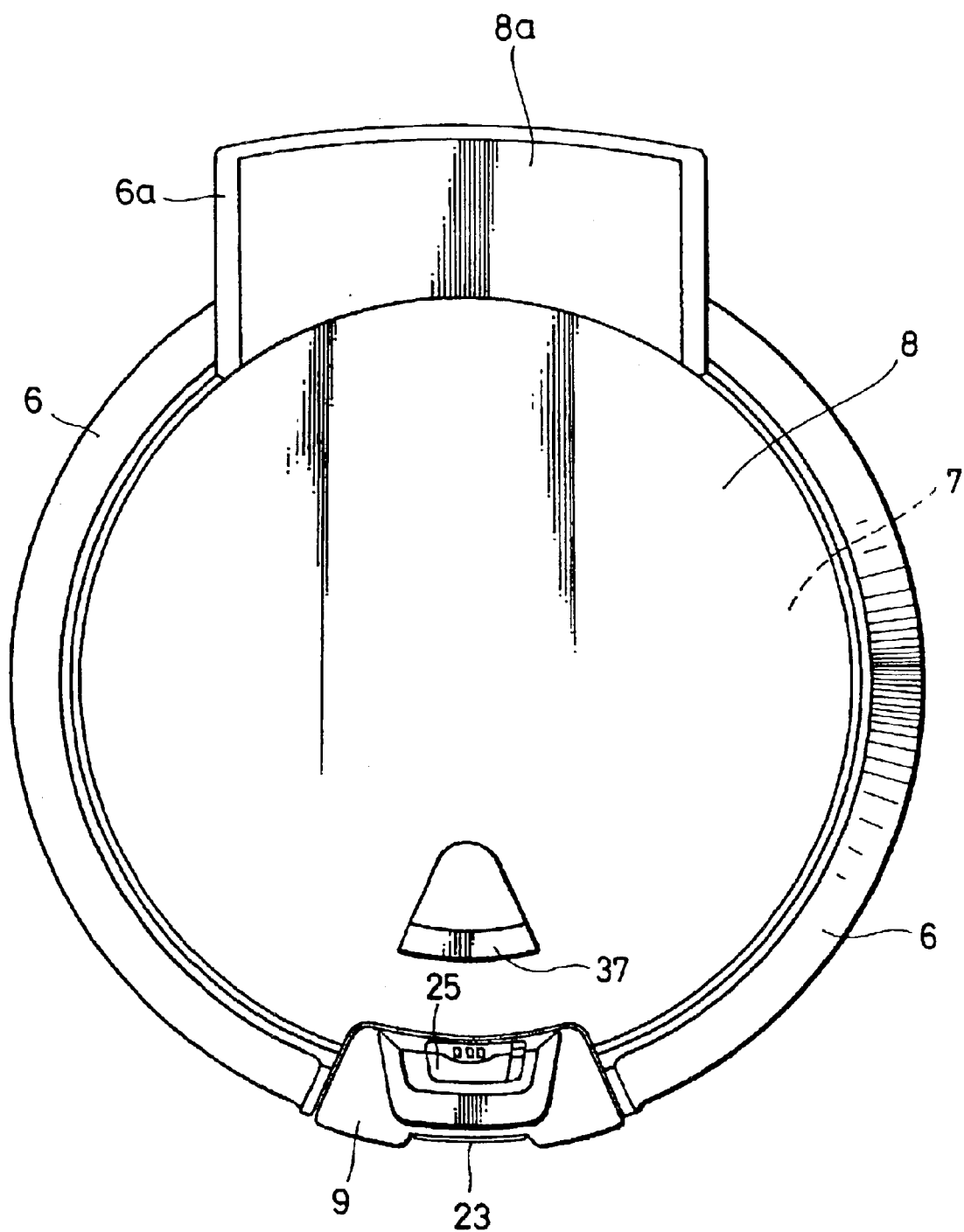
FIG. 5 is a plan view of a player main unit of the DVD player shown in FIG. 2.
Figure 6:
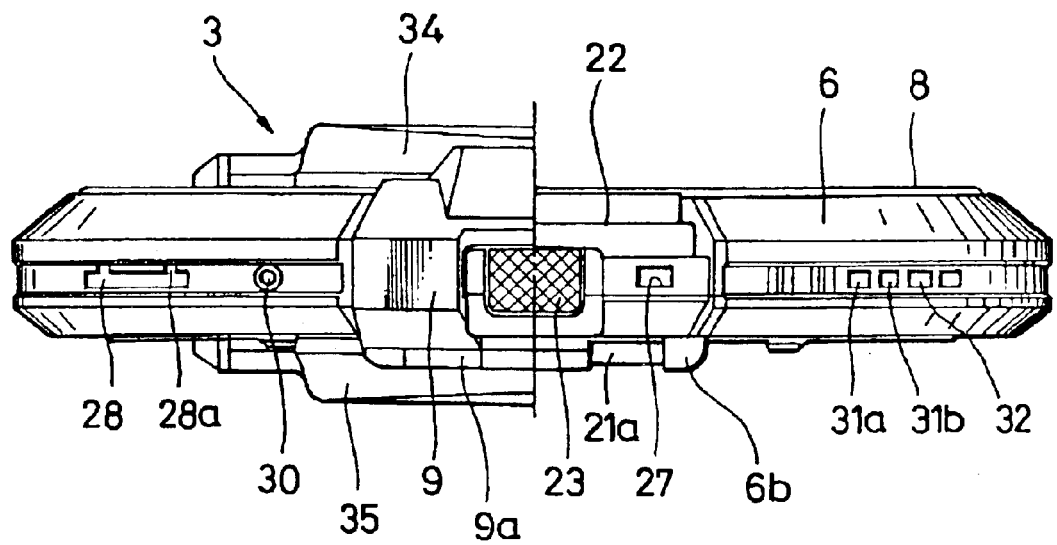
FIG. 6 is a front view of the battery housing, which is cut into halves, of the DVD player shown in FIG. 2.
Figure 7:
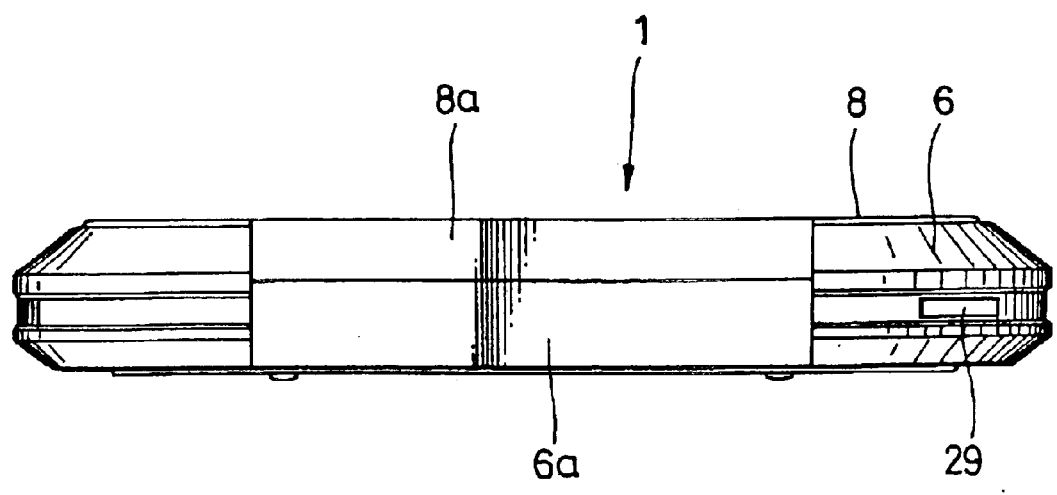
FIG. 7 is a rear view of the player main unit of the DVD player shown in FIG. 2.
Figure 8:
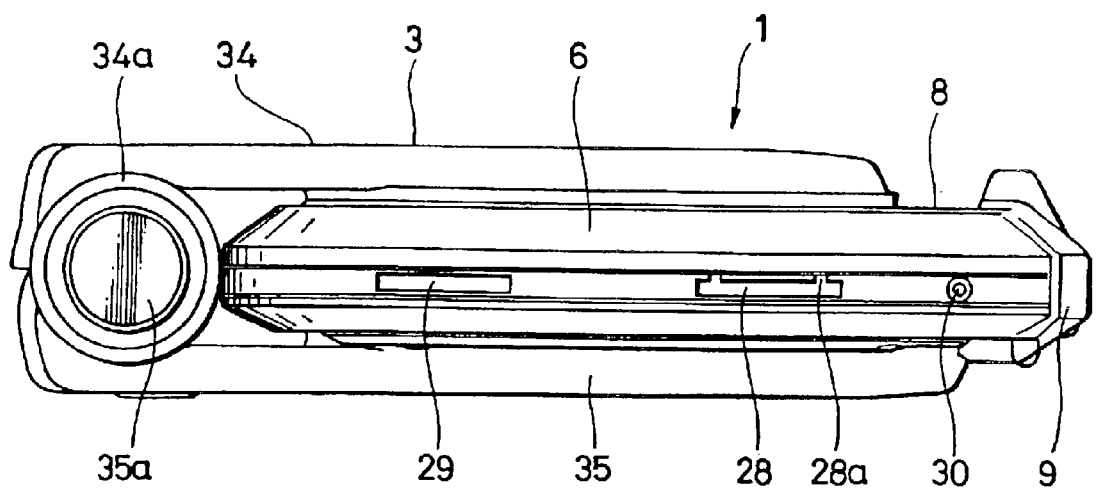
FIG. 8 is a side view of the DVD player shown in FIG. 2.
Figure 9:
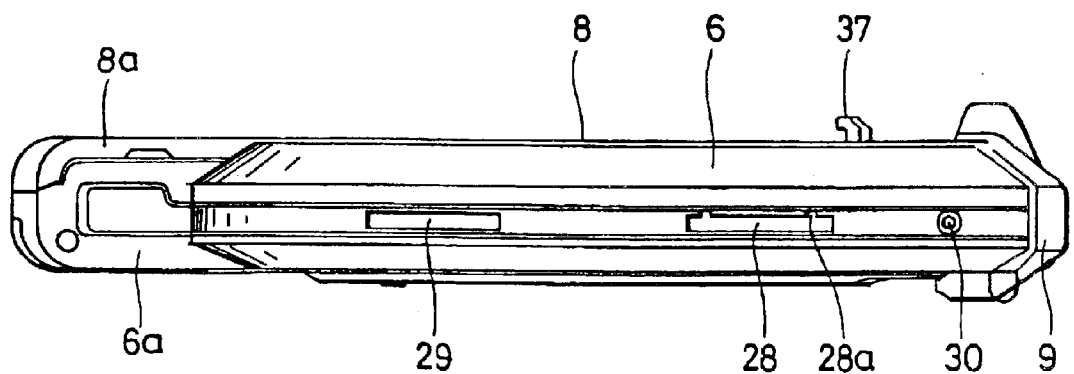
FIG. 9 is a side view of the player main unit of the DVD player shown in FIG. 2.

The safety circuit 41 is connected to a connector 42 shown in FIG. 4 and FIG. 14. The connector 42 is provided integrally on the rear surface of the lower battery case 35. A plug 43 provided in a detachable manner on the rear surface of the player main unit 6 is connected to the connector 42. Accordingly, the connector 42 is automatically connected to the plug 43 of the player main unit 6 by installing the battery housing 3 in the player main unit 6, whereby electric power is automatically supplied from the battery housing 3 to the player main unit 6.

As materials for the above configured player main unit 6, opening and closing cover 8, buckle 9, and the upper and lower battery cases 34 and 35, engineering plastic, for example, ABS (acrylonitrile butadiene styrene resin), POM (polyacetal resin) or the like may be applied. Moreover, aluminum alloys and other metals may be used for the materials.

Furthermore, the control device 2 has such a configuration as shown in FIGS. 1 and 19A to 19C, and in other figures. That is, the control device 2 comprises: a cabinet 50 which represents one specific example of a housing; a liquid crystal display 51 which represents one specific example of a display unit; a cover 52 which covers and uncovers the display surface of the liquid crystal display 51; an operation unit 53 comprised of various kinds of switching means, adjusting means, and the like; an electronic circuit which is stored in the cabinet; and other units.

The cabinet 50 comprises a hollow housing in an approximately quadrilateral shape, and an opening window 54 is provided as slightly shifted to one end in the longitudinal direction which is a transverse direction. In addition, a plurality of opening holes (three holes in the present embodiment) 55a, 55b and 55c are provided at appropriate distances in the widthwise direction at the other end in the longitudinal direction of the cabinet 50. The liquid crystal display 51 is fitted into the opening window 54, and various kinds of operation buttons in the operation unit 53 are inserted into the plurality of opening holes 55a to 55c, respectively.

In the first opening hole 55a located at the upper part, an operation button 56a is installed as a basic operation switch by which basic operations such as reproduction, fast-forwarding and rewinding are executed. With regard to the operation button 56a, on/off operation of reproduction may be realized by pushing, for example, the center part of the button 56a. And, fast-forwarding or rewinding operation may be selectively executed by pushing either side of the button.

In the second opening hole 55b located at the center, a selection button 56b is installed as a mode selection switch by which mode selection and decision may be executed. With regard to the selection button 56b, various kinds of modes may be selected by pushing, for example, any of the upper, lower, right and left parts of the button 56b, and the selected mode may be decided by pushing the center part of the button 56b after the selection. In addition, in the third opening hole 55c located at the lower part, a power supply button 56c is installed as a power supply switch. On/off of the power supply is executed by sliding the power supply button 56c in the transverse direction.

Furthermore, a long hole 55d extended in the widthwise direction is provided on the side surface of the cabinet 50 which is the side of the opening holes 55a to 55c. In the long hole 55d, two adjusting buttons 56d and 56e are installed as volume switches for adjusting the volume. The adjusting button 56d is to turn up the volume, and the other adjusting button 56e is to turn down the volume.

Figure 20:
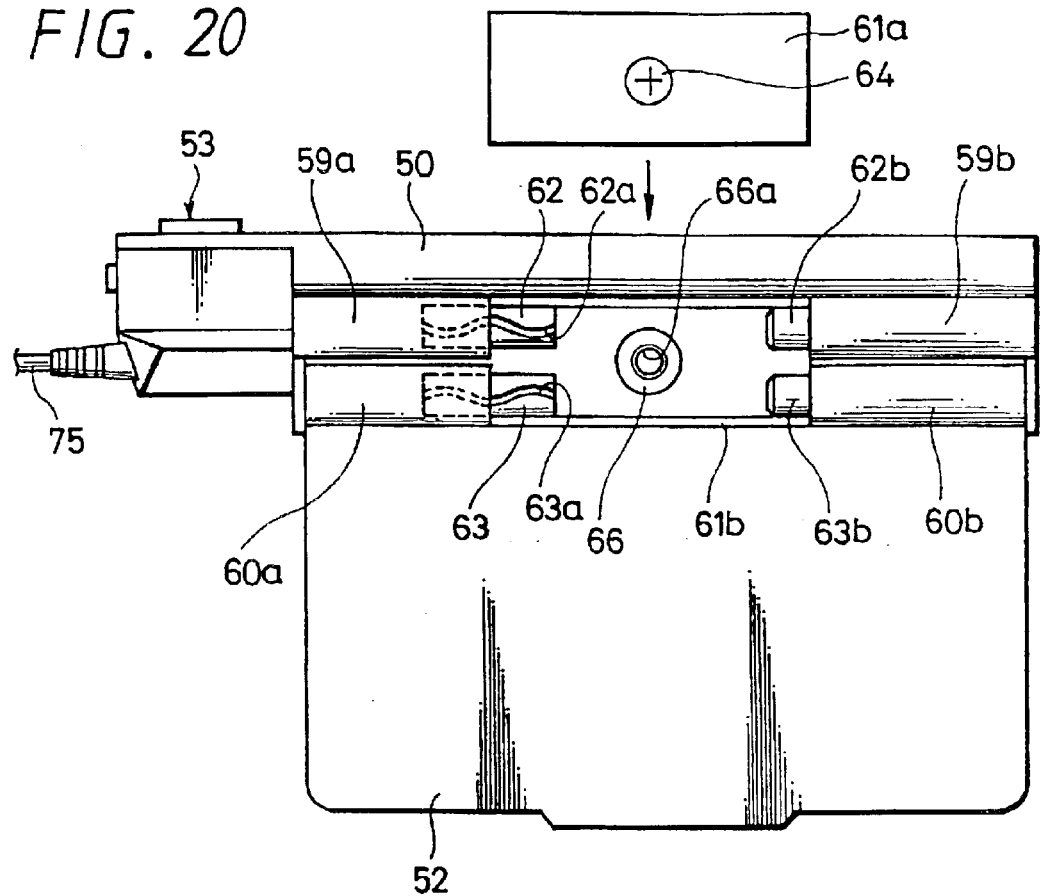
FIG. 20 is a plan view of the electronic device of FIG. 19, wherein a cover is opened.

As shown in FIG. 1, FIG. 20 and other figures, a connection unit 58 of the cover 52 is provided on the upper surface of the cabinet 50. The connection unit 58 comprises: protruding rails 59a and 59b provided on the upper surface of the cabinet 50; protruding rails 60a and 60b provided on the upper side of the cover 52; a connection block 61 which lies between the protruding rails 59a, 60a and the protruding rails 59b, 60b; two spring pins 62 and 63 which represent one specific example of resisting means; and the like.

Two sets of the protruding rails 59a, 60a and 59b, 60b are configured to have similar shapes and structures, and to be arranged on the same shaft center lines at a predetermined distance, respectively. One end of spring pins 62 and 63 in the axial direction is pressed under pressure into internal end surfaces of the protruding rails 59a, 60a of one set, respectively.

As shown enlarged in FIG. 19C, the spring pins 62 and 63 are metal cylindrical tubes formed with slits 62a and 63a. Each slit of 62a and 63a of the spring pins 62 and 63 is continuously provided from one end to the other end of the cylindrical tubes, and the diameters of those pins may be elastically reduced only by the amounts of each width of the slits 62a and 63a, whereby elasticity is given to the whole structure.

Here, the shapes of the slits 62a and 63a of the spring pins 62 and 63 are not limited to a waveform shown in the drawing according to the present embodiment, and another shape such as a straight-line, a curved-line, saw-toothed, or a horny one may be formed. As materials for the spring pins 62 and 63, metal such as spring steel, stainless steel or the like may be preferable, but engineering plastic may also be applied.

Further, convex shaft portions 62b, 63b protruding toward the spring pins 62 and 63 are provided in the internal end surface of protruding rails 59b, 60b of the other set, respectively. The diameters of each convex shaft portion 62b, 63b are set to approximately equal to the outer diameters of the spring pins 62 and 63, respectively. The two convex shaft portions 62b, 63b and the protruding portions of the two spring pins 62, 63 are covered with the connection block 61.

Figure 21:
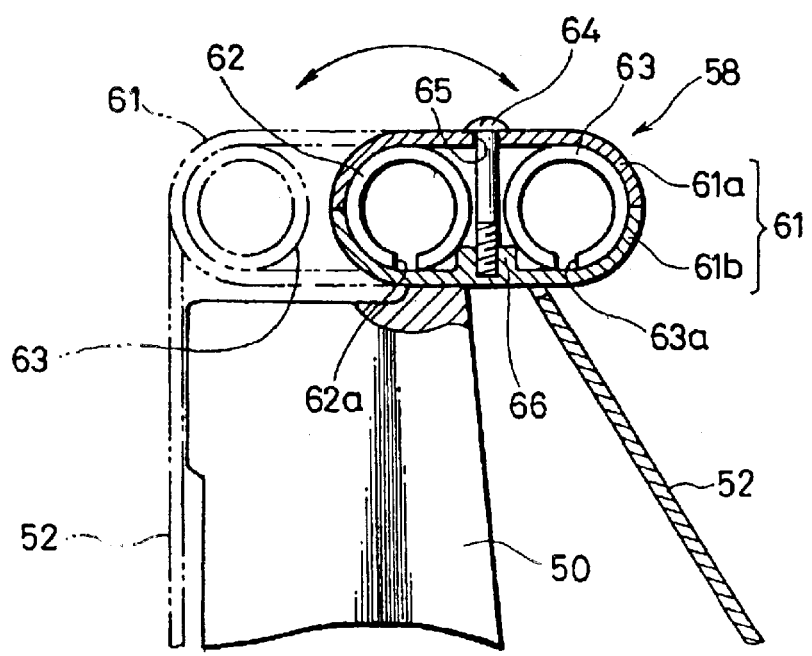
FIG. 21 is an explanatory view of the electronic device of FIG. 20, wherein a display device is cut at the center to show a main part.

As shown in FIG. 21, the connection block 61 is formed by a combination of a first block 61a and a second block 61b which are formed like gutters, and a fixing screw 64 for tightening and fixing both the blocks 61a, 61b. A through hole 65 is provided at approximately the center part of the first block 61a, and a boss 66 is arranged at approximately the center part of the inner surface of the second block 61b.

Further, a screw hole 66a into which a screw portion of the fixing screw 64 is fastened is provided at the boss 66.

The second block 61b is pressed on one side of the protruding portions of the two spring pins 62, 63 and the two convex shaft portions 62b, 63b, and then the other side is covered by the first block 61a. Thereafter, the fixing screw 64 is made to penetrate through both the blocks 61a, 61b, and its screw tip is screwed into the screw hole 66a of the boss 66, and to tighten the both blocks.

By constructing as described above, the cabinet 50 and the cover 52 are pivotally connected using the connection block 61 by a connection unit 58 which has hinged structures at two locations. In such a case, the amounts of reduction in the diameters of the spring pins 62 and 63 may be adjusted by adjusting the tightening force of the fixing screw 64. As a result, frictional forces generated between the connection block 61 and the spring pins 62, 63 may be varied by changing the diameters of the spring pins 62 and 63. Accordingly, operational forces required at operation of the cover 52 may be appropriately adjusted by changing the frictional force for opening and closing the cover 52.

Moreover, the cover 52 comprises a plate body with a size which may cover approximately an entire display surface including the liquid crystal display 51 of the cabinet 50. The above-described protruding rails 60a and 60b are provided integrally at the upper edge of the cover 52. The cover 52 and the cabinet 50 are pivotally connected by the connection unit 58 which has the hinged structures at two locations.

Thus, the cover 52 may be pivoted at a maximum angle of approximately 360 degrees with respect to the liquid crystal display 51 which is a display surface. Accordingly, by pivoting and moving the cover 52 at an angle of approximately 360 degrees backward, the cover 52 itself may function as a stand for the cabinet 50.

A first pivoting shaft parallel to the display unit is formed by the above first spring pin 62 and convex shaft portion 62b of the cabinet 50. The cabinet 50 and the connection block 61 are pivotally connected around the first pivoting shaft. Further, a second pivoting shaft is formed by the second spring pin 63 and the convex shaft portion 63b on the side of the cover 52. The second pivoting shaft is parallel to the first pivoting shaft, and the cover 52 and the connection block 61 are pivotally connected around the second pivoting shaft. The cover 52 may be fixed at an arbitrary position with respect to each pivoting shaft with a frictional force generated between the connection block 61 and the spring pin 62 or 63.

The electronic circuit contained in the cabinet 50 executes not only control on the control device 2, but also remote control on the player main unit 6. Therefore, though not shown in the figures, the electronic circuit comprises: a microcomputer which may execute predetermined control; a storage device (RAM) in which a predetermined program has been previously installed; a storage device (ROM) in which arbitrary information may be recorded; and other electronic members.

Engineering plastic such as ABS, POM or the like may be applied as materials for the cabinet 50, the cover 52, and the connection block 61 of the control device 2 in the above-described configuration. However, the materials are not limited to the above plastic, and aluminum alloys or other metals may be used for the materials.

As shown in FIG. 1, at one corner of the bottom surface as a first side surface, one end of a first connection cable 4 which connects the control device 2 to the player main unit 6 is pivotally supported by a pivot-supporting unit 160. In order to secure the pivoting operation by the pivot-supporting unit 160, an opening 168 which is opened to the bottom surface and to the right side surface as a second side surface perpendicular to the bottom surface, is provided at one corner of the bottom surface of the cabinet 50.

Figure 31:
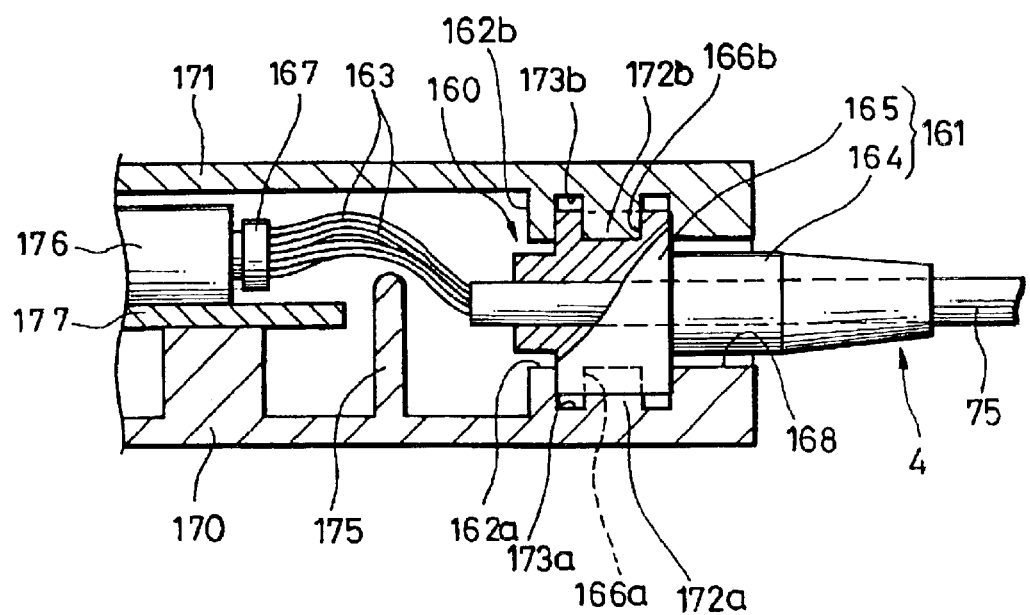
FIG. 31 is an explanatory sectional view showing the connection cable and a cabinet, which are connected to each other, of the electronic device shown in FIG. 1 according to the first embodiment of the present invention.
Figure 32:
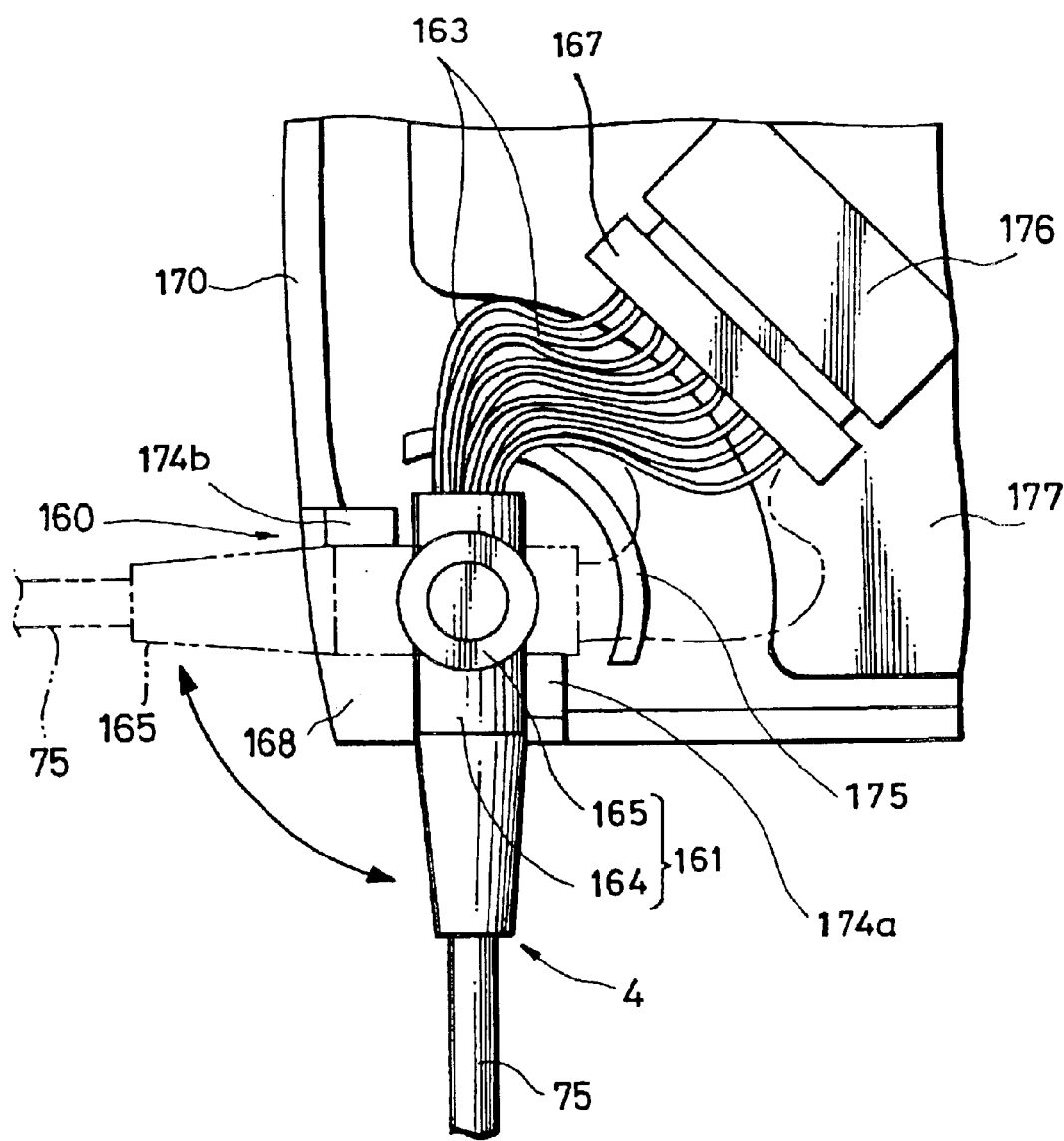
FIG. 32 is an explanatory view showing a pivoting state of the connection cable supported by the cabinet of the electronic device shown in FIG. 1 according to the first embodiment of the present invention.

As shown in FIG. 31, a pivot-supporting unit 160 comprises: on the side of the cable 4 a pivoting shaft portion 161 which shows one specific example of a pivoting convex portion; and on the side of the cabinet 50 shaft receiving portions 162a and 162b which show one specific example of a pivoting concave portion. The pivoting shaft portion 161 includes: a covering member 75 through which a number of wire rods 163 are inserted; a wire-rod direction shaft portion 164 through which the covering member 75 is inserted; and a crossing-direction shaft portion 165 which is extended in a direction perpendicular to the wire-rod direction shaft portion 164.

Figure 30:
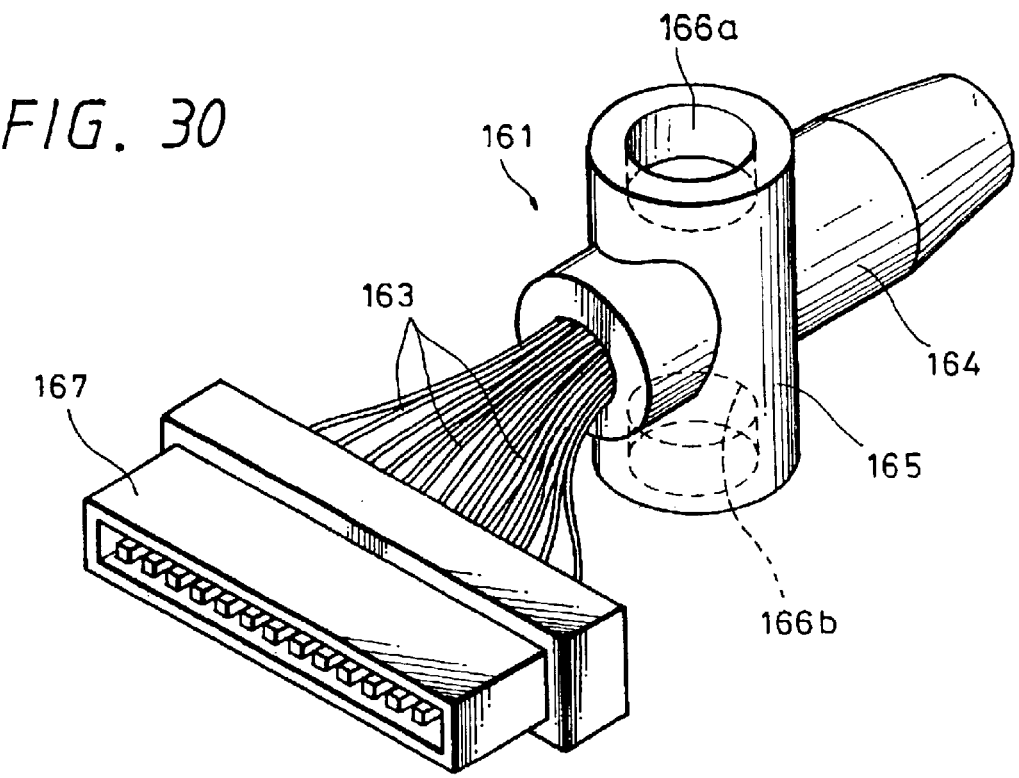
FIG. 30 is a perspective view of one end of a connection cable of the electronic device shown in FIG. 1 according to the first embodiment of the present invention.

The wire-rod direction shaft portion 164 and the crossing-direction shaft portion 165 are integrally formed. And, as shown in FIG. 30, at the both end surfaces of the crossing-direction shaft portion 165, a pair of shaft receiving holes 166a and 166b each comprising a circular concave recess representing one specific example of a tubular shaft receiving portion are provided.

It is preferable that the pivoting shaft portion 161 having the above-described configuration is integrally formed with a number of wire rods 163 and the covering member 75 by insert molding. According to the insert molding, troublesome work in assembling a number of wire rods 163 to be inserted into the shaft portions 164, 165 after the shaft portions 164, 165 are molded, may be eliminated. Obviously, it may be acceptable to separately mold the shaft portions 164, 165 in the first place, and to insert wire rods 163 in the second place. Here, a splicer 167 having a number of terminals is fitted to one end of a number of wire rods 163.

Figure 29:
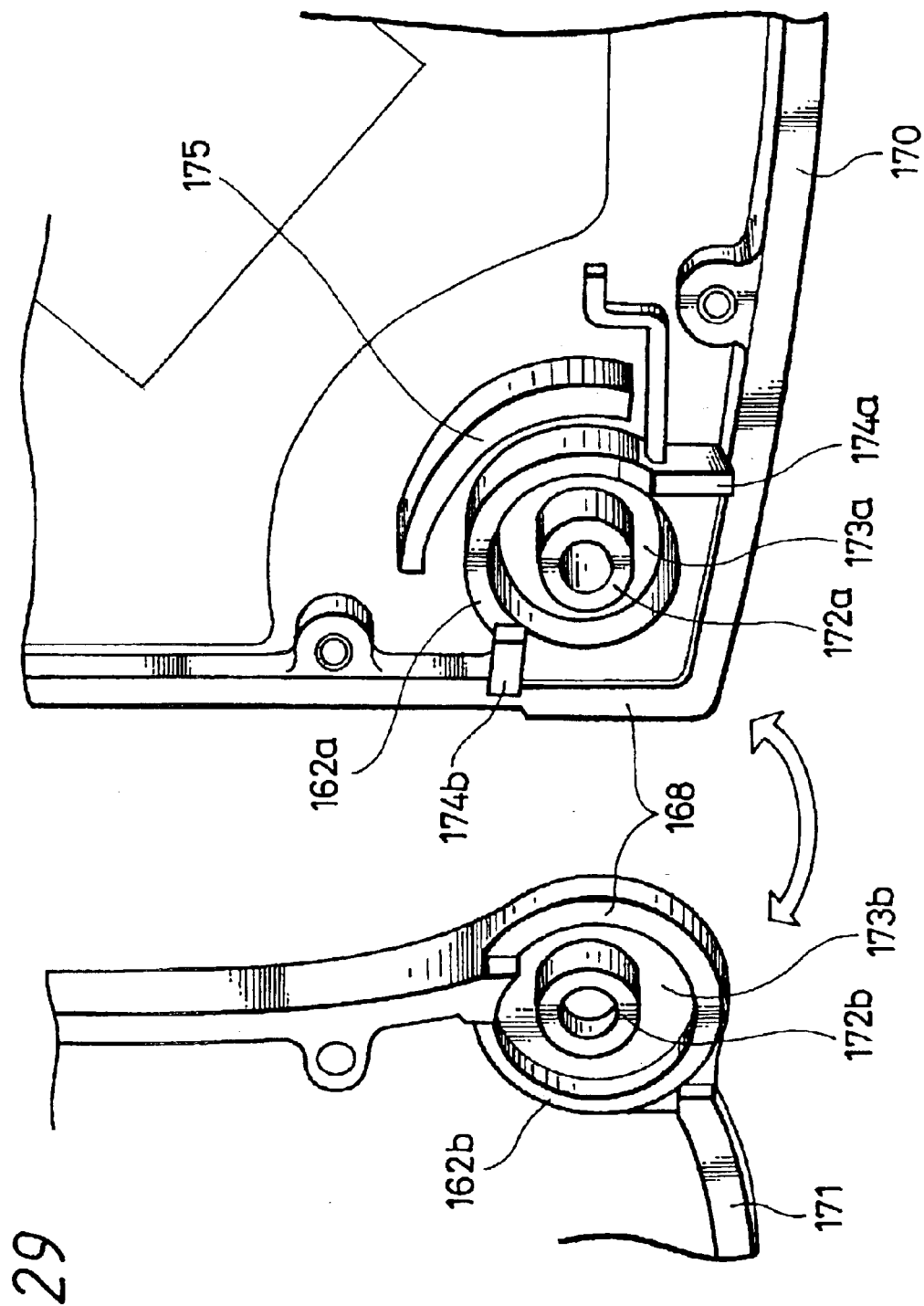
FIG. 29 is an explanatory view of a cabinet of an electronic device according to the first embodiment, wherein the cabinet is exploded into the front surface and the rear surface to show the main part.

Further, the shaft receiving portions 162a and 162b are formed as shown in FIG. 29. Specifically, a pair of shaft portions 172a and 172b positioned opposing to each other, and annular grooves 173a and 173b arranged around the shaft portions 172a and 172b, respectively, are provided in the shaft receiving portion 162a on a front plate 170 and the shaft receiving portion 162b on a back plate 171 both of which form the cabinet 50. Ring-shaped convex portions provided at each end of the crossing-direction shaft portion 165 are pivotally engaged with the above annular grooves 173a and 173b, respectively. And, each shaft portion 172a and 172b is pivotally engaged with the shaft receiving holes 166a and 166b provided at both end surfaces of the crossing-direction shaft portion 165, respectively.

In addition, two stoppers 174a and 174b are provided at the inside of an opening portion 168 of the front plate 170 to limit the pivoting angle of the pivoting shaft portion 161. The two stoppers 174a and 174b are provided at positions such that the pivoting shaft portion 161 may pivot by an angle of approximately 90 degrees, and the two stoppers function as a locking member.

Furthermore, a partition 175, which lifts the wire rods 163 and bends them to the side of the back plate 171 as shown in FIG. 31, is provided at the inside of the shaft receiving portion 162a on the front plate 170. The partition 175 is set higher than the height at which the wire rods 163 are inserted into the cabinet 50. Lifting the wire rods 163 with the partition 175 prevents the wire rods 163 from being scraped and disconnected against the edge of the printed-circuit board 177 mounting a socket 176 to which the splicer 167 is connected.

Figure 33:
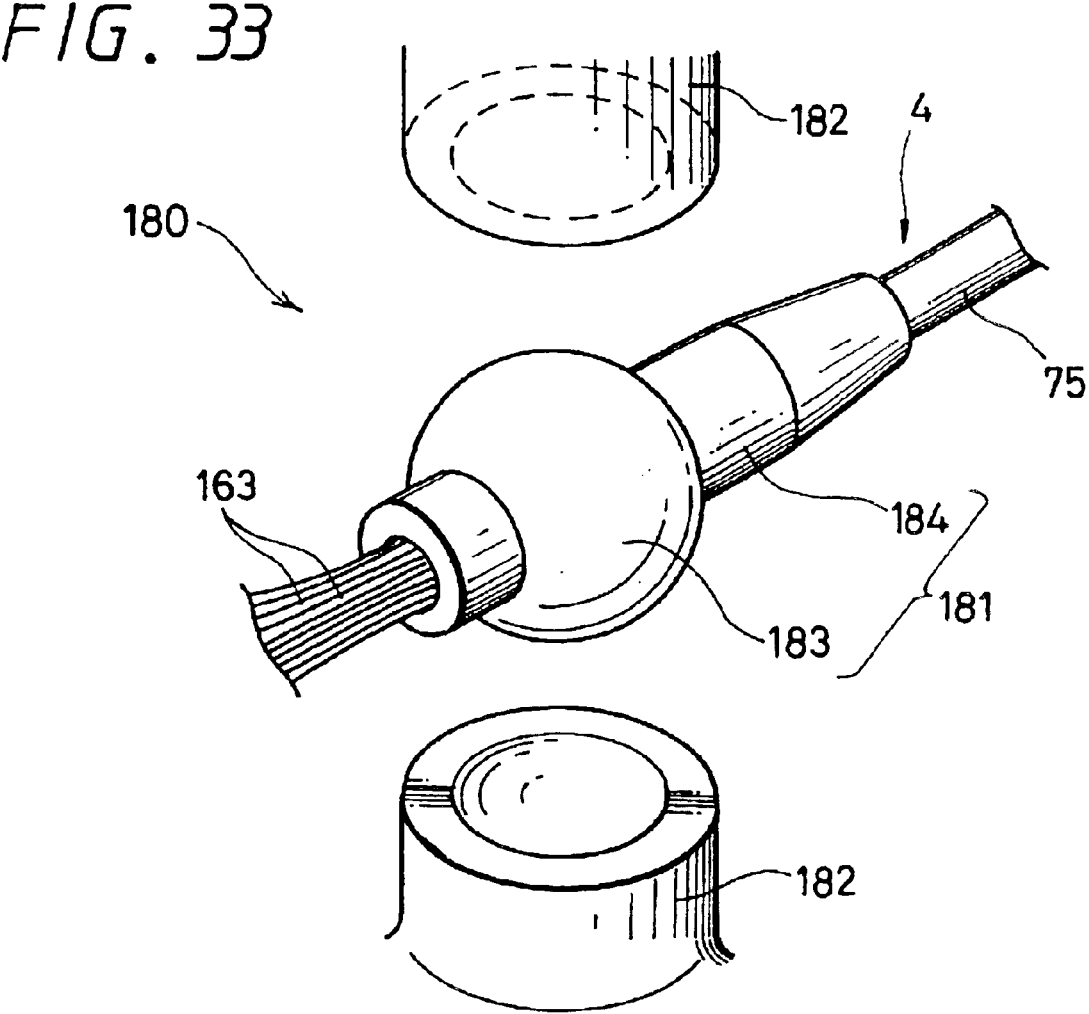
FIG. 33 is an exploded perspective view showing another embodiment of a connection method by which a connection cable and a cabinet of the electronic device shown in FIG. 1 are connected.

FIG. 33 shows a pivot supporting unit according to a second embodiment of the present invention. The pivot supporting unit 180 comprises: a pivoting shaft portion 181 which is a pivoting convex portion integrally provided with the covering member 75, and a pair of spherical body receiving portions 182 and 182 which are pivoting concave portions to pivotally support the pivoting shaft portion 181. The pivoting shaft portion 181 comprises a spherical body 183 in spherical shape, and a tubular shaft portion 184 which is provided such that the portion 184 passes through the spherical body 183, wherein a number of wire rods 163 are inserted into the tubular shaft portion 184.

The pair of spherical body receiving portions 182 and 182 are arranged to be opposed to each other at a predetermined distance, and a receiving spherical surface is formed on each surface. The spherical body 183 is supported by the pair of spherical body receiving portions 182 and 182, whereby the pivoting shaft portion 181 is pivotally supported by a pivoting angle of 360 degrees in a direction intersecting with the direction which connects the pair of the spherical body receiving portions 182 and 182.

Consequently, by pivoting the pivot-supporting unit 160 (or 180), the lead-out direction of the first connection cable 4 from the opening 168 of the cabinet 50 to the outside may be selectively changed between a direction in which the connection cable 4 is led downward from the lower surface of the cabinet 50 and a direction intersecting with the lower surface in which the cable is led sideways to the right side surface.

A first plug 70 to connect the player main unit 6 is integrally attached to the other end of the connection cable 4. The first plug 70 comprises: a plug main body 71 having a hollow body with a quadrilateral section, a cap 72 in a semicircular shape which is joined to the rear side of the plug main body 71, a terminal cover 73 which is protruding from the tip of the plug main body 71, and the like.

A tip end of the cap 72 is formed thinner in the width. And, protruding guide rails 74, which regulate the inserting direction when the cap 72 is inserted into the first socket 28 of the player main unit 6, are provided at two positions on one surface of the thinner part of the cap 72. Corresponding to the protruding guide rails 74, a pair of guide grooves 28*a* which are slidably fitted to the rails are provided in the first socket 28.

In addition, in order to prevent insertion error, a convex portion 74*a* which protrudes forward like a circular arc is provided at the tip end of a thicker end on one surface of the plug main body 71. Also, for that purpose, a concave portion corresponding to the convex portion which opens at the tip end of a thicker end of the plug main body 71 like a circular arc is provided.

As described above, since the convex and concave portions which prevent insertion error are provided at the tip end of the plug inserting end of the plug main body 71, a number of terminals disposed in the terminal cover 73 may be prevented from being damaged by insertion error of the first plug 70. Moreover, since a pair of protruding guide rails 74 are provided in the plug main body 71, terminals in the terminal cover 73 may be prevented from being damaged by tensile external-forces in the direction of twisting to extract the first plug 70.

In the terminal cover 73 of the first plug 70, which is comprised of a slender frame with a quadrilateral section, a number of terminals are arranged in a row (or in a plurality of rows) along the longitudinal direction. And, one end of a covering member 75 which is extending sideways is connected to the rear part of the cap 72. A number of wire rods 163 are inserted through the covering member 75, and the control device 2 and the player main unit 6 are electrically connected by the above wire rods 163.

By setting the pulling-out direction of the wire rods sideways as described above, the lead-out direction of the connection cable 4 may be regulated such that the above lead-out direction is approximately the same direction as the longitudinal direction of the battery housing 3. Accordingly, loads applied to the connection portion of the first plug 70 of the connection cable 4 may be reduced, whereby troubles such as a short circuit and an open circuit may also be reduced. Here, the plug main body 71 of the first plug 70 is inserted up to the root of the protruding guide rails 74.

Further, a second plug 77 provided at one end of the second connection cable 5 to connect the player main unit 6 to other electronic devices is installed in a detachable manner in the second socket 29. The second plug 77 has a terminal cover 78 which is protruding from the tip on the plug inserting side. The terminal cover 78 comprises a slender frame with a quadrilateral section. A number of terminals are arranged in a row (or in a plurality of rows) along the longitudinal direction in the above cover 78.

One end of the wire rods 79 is connected to the rear surface of the second plug 77, and the other end of the wire rods 79 is connected to a connector 80. The connector 80 connects the player main unit 6 to other electronic devices (for example, a television set). The second connection cable 5 is formed of the second plug 77, the wire rods 79, and the connector 80.

The connector 80 comprises a hollow housing in a flat shape, and the wire rods 79 are connected to one end surface. A plurality of terminals 81 are arranged in a row on the other end surface of the connector 80. As the above terminals 81, for example, a video terminal, an S1 video terminal, right and left audio terminals or the like may be listed.

An electronic device with the above-described configuration may be used in the following way, for example. The battery housing 3 is integrally joined to the player main unit 6 in advance. That is, the player main unit 6 is inserted from its protruding portion 6*a* into between the upper battery case 34 and the lower battery case 35 of the battery housing 3. Then, the engagement concavo-convex portion 36 of the upper battery case 34 is made to engage the hook 37 of the opening and closing cover 8.

As shown in FIG. 4, at this time the plug 43 provided in the player main unit 6 is engaged with the connector 42 provided in the lower battery case 35 by inserting the player main unit 6 up to a predetermined position. As a result, the player main unit 6 and the battery housing 3 are electrically connected to each other. Subsequently, the fixing screw 38 of the lower battery case 35 is screwed into a screw hole of the player main unit 6 to fasten the above case 35 and the main unit 6. Fitting the battery housing 3 to the player main unit 6 is thus completed.

Then, the first plug 70 of the first connection cable 4 is inserted into the first socket 28 of the player main unit 6, and the control device 2 is connected to the player main unit 6 through the first connection cable 4. With this, the player main unit 6, the battery housing 3 and the control device 2 are electrically connected to each other to enable the operation of the DVD player 1.

Thus, the control device 2 and the player main unit 6 are connected through the wire rods 163, whereby a remote control signal may be sent from the control device 2, which is a controller, to the player main unit 6 through the wire rods 163. Further, when the player main unit 6 reproduces the information recorded in an optical disc according to the remote control signal sent from the control device 2, the reproduction signal is sent to the control device 2 through the wire rods 163.

The control device 2 which has received the reproduction signal displays the received reproduction signal on the liquid crystal display 51 as a picture. A user reproduces the information previously recorded in a disc, and by watching the picture the user enjoys the information as the picture. Audio information may also be enjoyed simultaneously through an earphone by connecting the earphone to the player main unit 6.

Operation to install an optical disc in the player main unit 6 of the DVD player 1 may be performed in the following manner, for example. In the first place, the buckle 9 is pulled up, and the locked state of the opening and closing cover 8 with the buckle 9 is released. That is, the buckle 9 may be caught with a finger to be pulled up against the spring force of the spring member 152. With this, the buckle 9 is directly pulled up without the sliding operation of the sliding member 151 and is unlocked in a simple manner.

In this case, since the spring force of the spring member 152 becomes resistant to the pulling-up operation of the buckle 9, applying a comparatively large force to the buckle 9 is required.

As a different manner, sliding operation of the sliding member 151 to unlock with a small force the locked state of the buckle 9 is provided, wherein the engagement body 9b is made to move backward by the operation to release the engagement with the engagement receiving unit 26. With this, the locked state of the buckle 9 is released and the buckle 9 is pulled up easily with a small force by pivoting the buckle 9 around the hinge unit 21.

Thus, when the buckle 9 is pulled up, the opening and closing protrusion 156 provided on the inner surface of the buckle 9 is extracted from the buckle detection hole 27 provided on the front surface of the player main unit 6. Then, the detector which detects the locked state of the buckle 9 becomes off, and the detection signal is sent to the control device 2.

Then, the engagement receiving unit 26 exposed by pulling up the buckle 9, or the like is held by a fingertip to lift the front side of the opening and closing cover 8 to an arbitrary height. Accordingly, the disc housing unit 7 provided on the upper surface of the player main unit 6 is released, and the disc drive device 10 is exposed.

At this time, the opening and closing detection piece 19 of the opening and closing cover 8 is extracted from the detection hole 20 for the cover of the player main unit 6. Then, the detecting switch which detects opening and closing state of the opening and closing cover 8 becomes off, and the detection signal is sent to the control device 2. When neither a signal of the opening and closing cover 8 indicating its open state nor the detection signal of the above buckle 9 are supplied to the control device 2, that is, when the opening and closing cover 8 is open or when the buckle 9 is open, the disc drive device 10 is not driven.

Here, the upper battery case 34 of the battery housing 3 is moved integrally with the opening and closing cover 8 and is lifted upward therewith. Thus, as shown in FIG. 10, the disc housing unit 7 is opened, and the turntable 11 of the disc drive device 10 is exposed. Thereafter, a desired optical disc is installed on the turntable 11 to execute chucking of the optical disc.

Then, the opening and closing cover 8 is pushed down together with the upper battery case 34, and the disc housing unit 7 is closed with the opening and closing cover 8. At this time, by completely closing the opening and closing cover 8, the opening and closing detection piece 19 is inserted into the detection hole 20 for detecting the state of the cover. As a result, the detecting switch which detects the closed state of the opening and closing cover 8 becomes on, and the detection signal is supplied to the control device 2. The driving of the disc drive device 10 will not be started only by this detection signal.

Then, the buckle 9 is pushed up to engage the engagement body 9b with the engagement receiving unit 26. Thus, the opening and closing cover 8 is firmly locked to the player main unit 6 with the buckle 9. At this time, by completely closing the buckle 9, the opening and closing protrusion 156 is inserted into the buckle detection hole 27. As a result, the detecting switch which detects the locked state of the buckle 9 becomes on, and the detection signal is supplied to the control device 2. This detection signal and the above-described detection signal for the opening and closing cover are both supplied to the control device 2, whereby the disc drive device 10 starts driving.

Although the DVD player 1 thus prepared is available for indoor use, it is preferably used outdoors. In such a case, it is preferable to construct the DVD player 1 such that the DVD player 1 is suspended from a neck etc. to be portable with a strap not shown in the figures.

In such a case, the user may enjoy picture information recorded on an optical disc with holding the control device 2 by hands for the operation, using the liquid crystal display 51 of the control device 2. Further, the user may enjoy audio information recorded on an optical disc with earphones connected to the earphone jack 30.

Figure 22A:
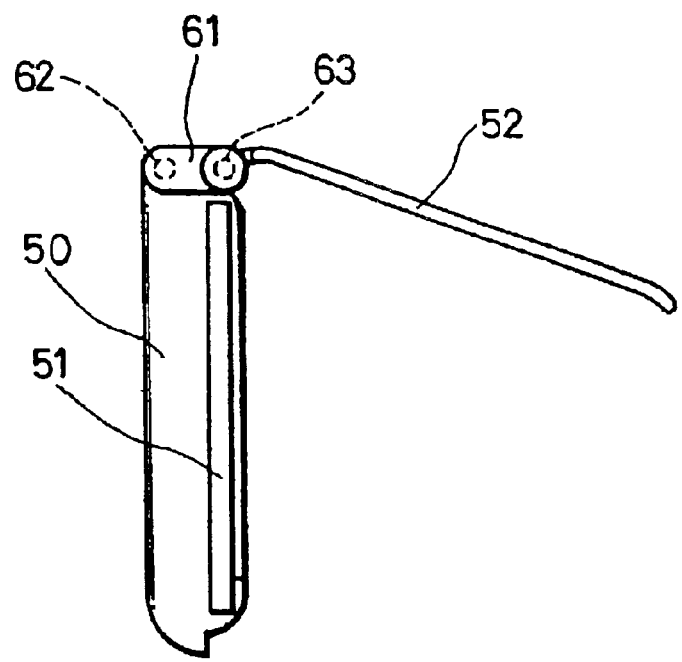
FIG. 22A is a side view of explaining the electronic device according to the first embodiment of the present invention put under use, wherein the cover is opened at an angle of slightly smaller than 90 degrees.

Hereinafter, embodiments of the operation on the control device 2 will be described. FIG. 22A shows a state in which a user holds the control device 2 by hand, and the cover 52 is opened at an angle of slightly smaller than 90 degrees with respect to the liquid crystal display 51 of the display surface of the cabinet 50.

In this case, a frictional force generated between the spring pin 63 of the second pivoting shaft and the connection block 61 is set to be smaller than a frictional force generated between the spring pin 62 of the first pivoting shaft and the connection block 61 (for example, the thickness of the spring pin 62 is set to be larger than that of the spring pin 63, and the elasticity of the spring pin 62 is set to be larger than that of the spring pin 63.).

At first, the first pivoting shaft is in a state of being fixed, and the cover 52 is rotated around the second pivoting shaft. When the amount of pivoting with respect to the second pivoting shaft becomes maximum, the cover 52 starts to pivot around the first pivoting shaft.

In the first place, the cover 52 is pulled up by a fingertip which caught the free end thereof. Since the frictional force caused by the spring pin 62 of the first pivoting shaft is larger than that of the spring pin 63 of the second pivoting shaft, the cover 52 is pivoted around the spring pin 63 of the second pivoting shaft and the second convex shaft portion 63b.

Then, as shown in FIG. 22A, when the cover 52 is stopped at an arbitrary angle of smaller than 90 degrees, the cover 52 is fixed by the frictional force of the spring pin 63 at an angle at which the cover 52 has been stopped. In such a state, though a user may watch contents displayed on the liquid crystal display 51, it is difficult for others to look in the contents, thereby preventing the contents from being peeped by surrounding others.

Figure 22B:
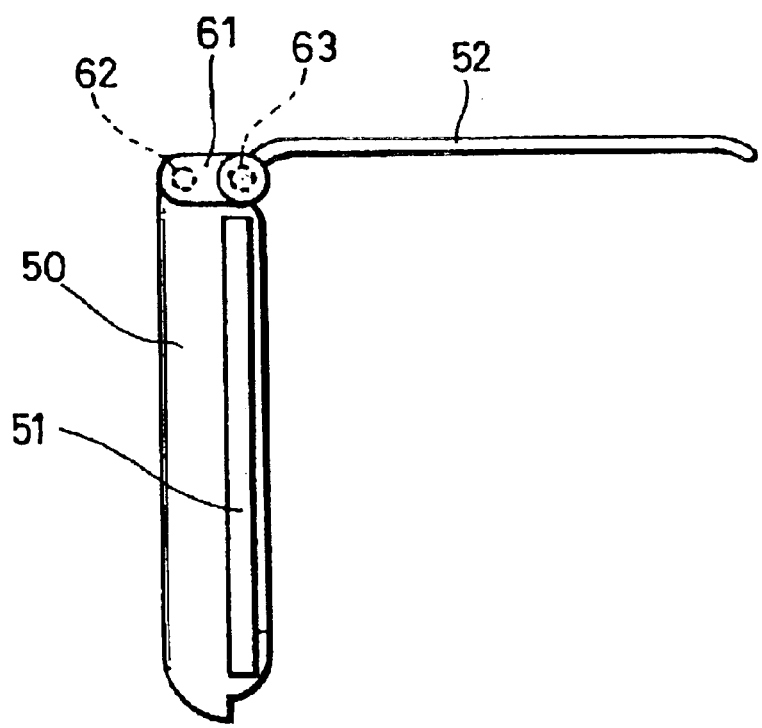
FIG. 22B is a side view of explaining the electronic device according to the first embodiment of the present invention put under use, wherein the cover is opened at an angle of approximately 90 degrees.

FIG. 22B shows a state in which a user holds the control device 2 by hand, and the cover 52 is opened at an angle of 90 degrees to the liquid crystal display 51 of the cabinet 50. Since the cover 52 is stopped at an angle of about 90 degrees, the cover 52 may be used as a sunshade.

Figure 23A:
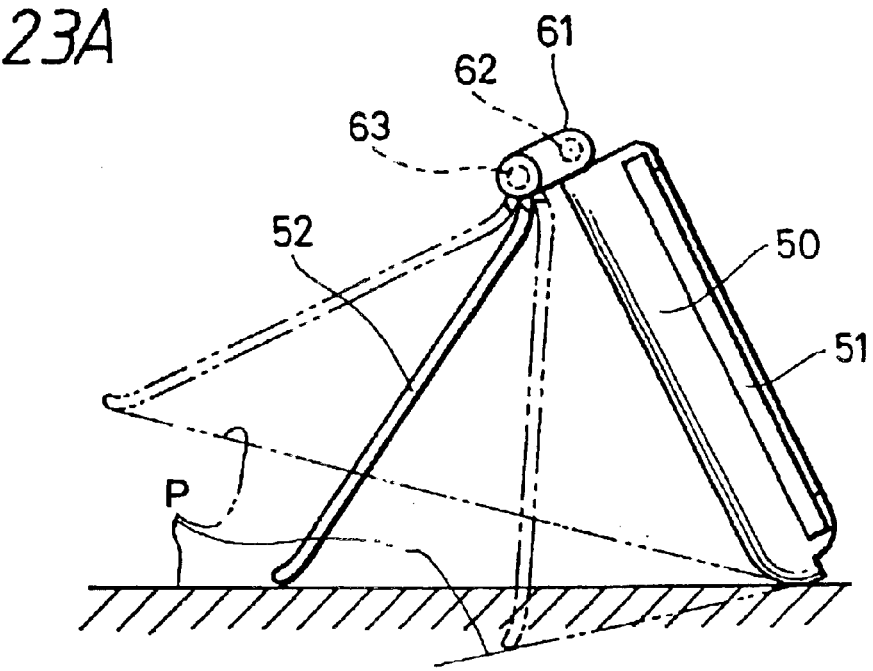
FIG. 23A is a side view of explaining the electronic device according to the first embodiment of the present invention put under use, wherein the cover is opened as a stand at an angle of approximately 270 degrees.

Further, FIG. 23A shows a state in which the cover 52 is pivoted at an arbitrary angle of equal to or larger than 270 degrees to the display surface of the cabinet 50, and the cabinet 50 and the cover 52 are mounted on a plane P (mounting surface) such as a desk or the like at their free ends, respectively. The above state shows the result after the connection block 61 is pivoted from the state shown in FIG. 22B by 180 degrees around the spring pin 62 of the first pivoting shaft and the first convex shaft portion 62b.

Subsequently, the cover 52 is pivoted at an arbitrary angle of smaller than 90 degrees around the spring pin 63 of the second pivoting shaft and the second convex shaft portion 63b. With this, as shown in FIG. 23A, the cover 52 may be used as a stand for supporting the cabinet 50. In this case, a user may freely change the angle of inclination of the cover 52 to the cabinet 50, whereby the display surface of the liquid crystal display 51 is set for the user to watch the display surface without difficulties.

Figure 23B:
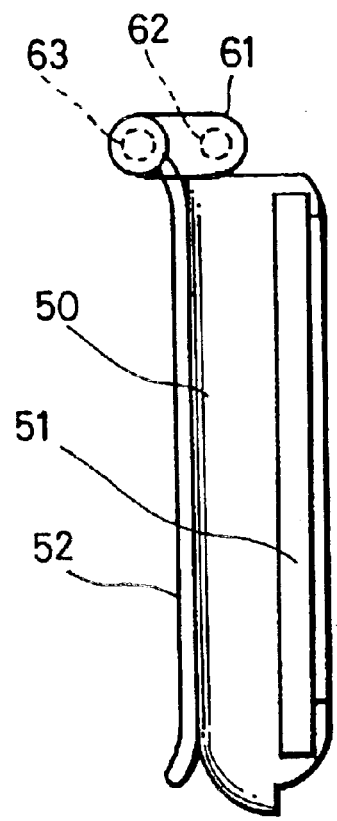
FIG. 23B is a side view of explaining the electronic device according to the first embodiment of the present invention put under use, wherein the cover is opened at an angle of 360 degrees.

FIG. 23B shows a state in which the cover 52 is pivoted by 360 degrees with respect to the display surface of the cabinet 50, and is right on the rear surface of the cabinet 50. In this case, the cover 52 will not become an obstacle when a user watches the display surface while holding the control device 2 by hands.

Figure 24A:
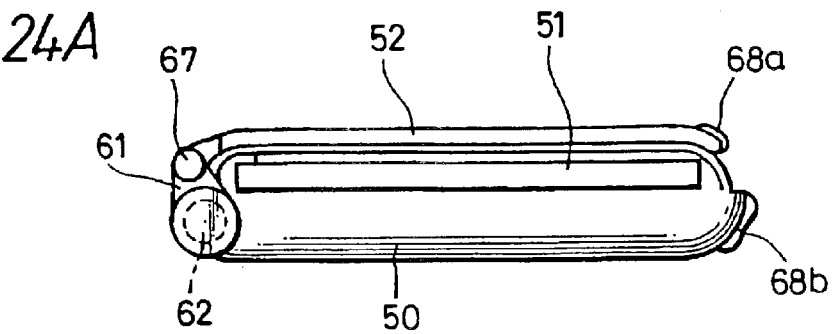
FIG. 24A is a side view of an electronic device according to a second embodiment of the present invention, wherein a cover is closed.

FIG. 24A shows another embodiment in which, of those two spring pins 62 and 63 used in the above described control device 2, the spring pin 63 of the second pivoting shaft is replaced with a rotating shaft 67, and the cover 52 and the connection block 61 are pivotally connected by the rotating shaft 67. In this case, the protruding rails of the cabinet 50 and the connection block 61 are pivotally connected with a frictional force caused by the elasticity of the spring pin 62 in a similar manner to that of the above embodiment. Here, anti-slipping rubbers 68a and 68b are stuck as an anti-slipping member on free ends of the cover 52 and the cabinet 50, respectively.

Figure 24B:
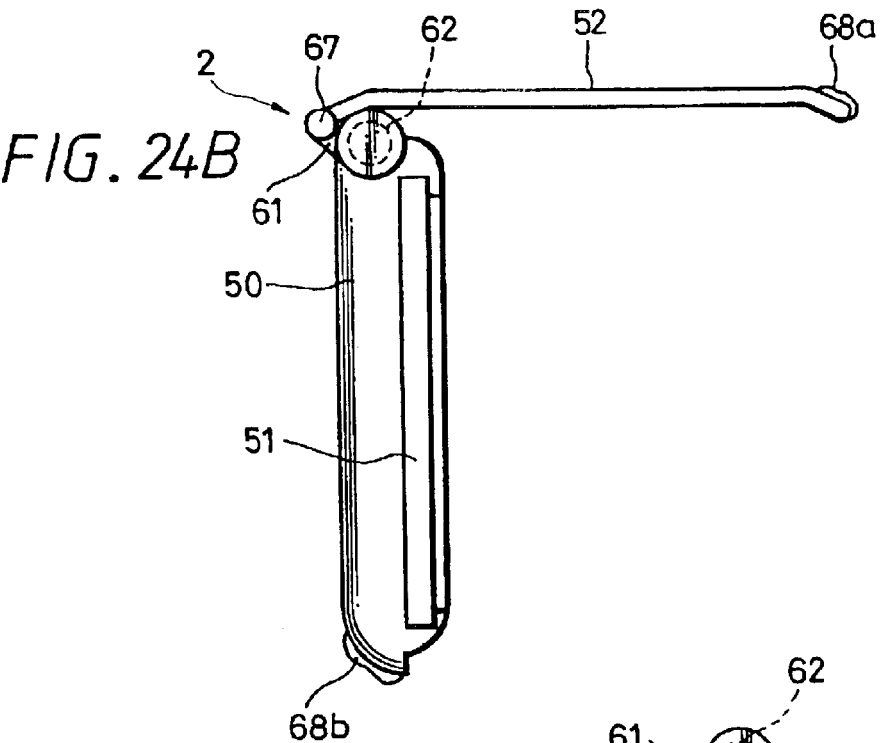
FIG. 24B is a side view of the electronic device according to the second embodiment of the present invention, wherein the cover is opened at an angle of approximately 90 degrees.

FIG. 24B is an explanatory view of the operation of the control device 2 shown in FIG. 24A. FIG. 24B shows a state in which a user holds the control device 2 by hands, and the cover 52 is opened at an angle of 90 degrees to the display surface of the cabinet 50. With this state, the display surface may be watched by a user without difficulties using the cover 52 as a sunshade.

As shown in FIG. 24B, when the rotating shaft 67 is moved to the diagonally rear position of the spring pin 62, the rotating shaft 67 pivotally connects the cover 52 and the connection block 61 without any frictional force. However, the cover 52 may be held at a position at which the body 52 is pivoted at an angle of approximately 90 degrees to the display surface of the cabinet 50 only by the frictional force based on the elasticity between the spring pin 62 and the connection block 61.

Figure 24C:
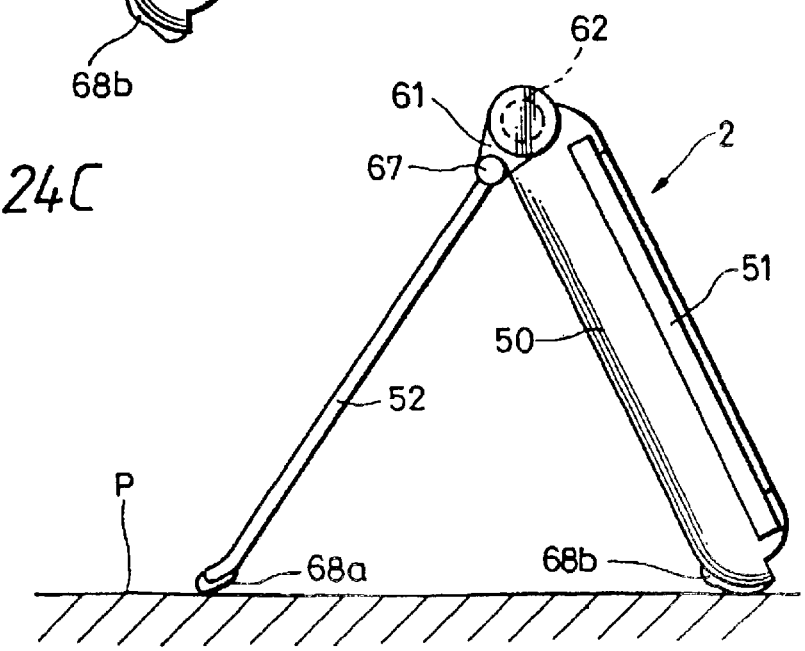
FIG. 24C is a side view of the electronic device according to the second embodiment of the present invention, wherein the cover is opened at an angle of approximately 270 degrees.

FIG. 24C shows a state in which the cover 52 is pivoted at an arbitrary angle of equal to or larger than 270 degrees to the display surface of the cabinet 50, and the cabinet 50 and the cover 52 are mounted on a plane P (mounting surface) such as a desk or the like at the free ends, respectively. In this state, the cabinet 50 may be kept standing on a horizontal plane by using the cover 52 as a supporting stand. Thus, a user may freely change the angle of inclination of the cover 52 to the cabinet 50, whereby the display surface of the liquid crystal display 51 is set for the user to watch the display surface without difficulties.

Moreover, since the anti-slipping rubbers 68a and 68b are fitted to the free ends of the cabinet 50 and the cover 52, there is no possibility that the control device 2 slides on a plane P such as a desk or the like. Accordingly, the inclination angle of the cabinet 50 may be kept at an arbitrary angle by using the cover 52 as a supporting stand, even when the rotating shaft 67 is used as one pivoting shaft.

Figure 25:
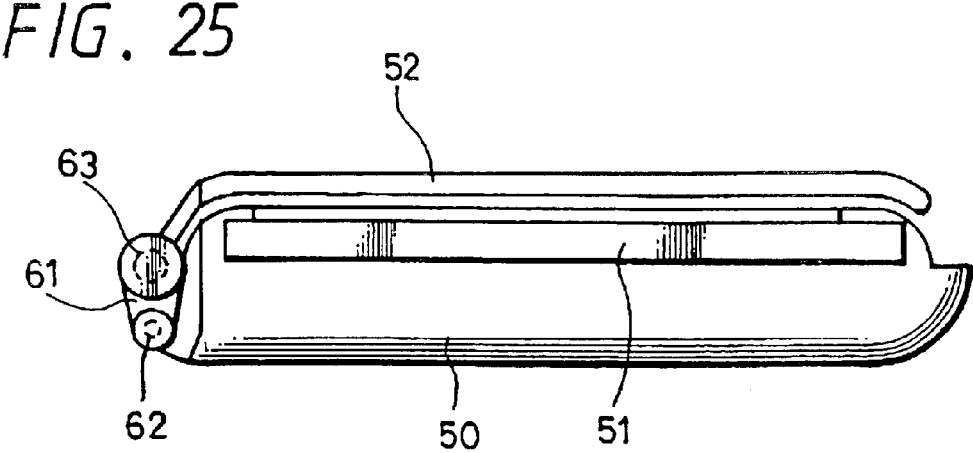
FIG. 25 is a side view of an electronic device according to a third embodiment of the present invention, wherein a cover is closed.

FIG. 25 shows a further embodiment in which the diameters of two spring pins 62 and 63 are made to be different to have different magnitude of elasticity. For example, with regard to a pair of spring pins 62 and 63, the diameter of the first spring pin 62 is made to be smaller, and that of the second spring pin 63 is made to be larger, and the frictional force of the second spring pin 63 is set to be larger than that of the first spring pin 62. In this embodiment, similarly to the embodiment shown in the above FIGS. 22A, 22B and the like, the spring pin 62 with a smaller elasticity is configured to be preferentially pivoted, and pivoting of the spring pin 63 with a larger elasticity will be started after the pivoting amount of the spring pin 62 becomes the maximum.

In this embodiment, whenever the cover 52 is made to be opened or closed with respect to the display surface of the cabinet 50, first the cover 52 is pivoted around the first pivoting shaft with the spring pin 62 having a smaller elasticity, and secondly the cover 52 is pivoted around the second pivoting shaft with the spring pin 63 having a larger elasticity.

Specifically, with opening and closing operation of the cover 52, the connection block 61 is first pivoted with respect to the cabinet 50 around the spring pin 62. Secondly, the cover 52 is pivoted with respect to the connection block 61 around the spring pin 63. In this embodiment, with regard to the first and second pivoting shafts arranged parallel to each other, a pivoting shaft with the spring pin 62 having a smaller elasticity is preferentially pivoted, whereby pivoting of the cover 52 to the cabinet 50 may be smoothly executed.

Figure 26A:
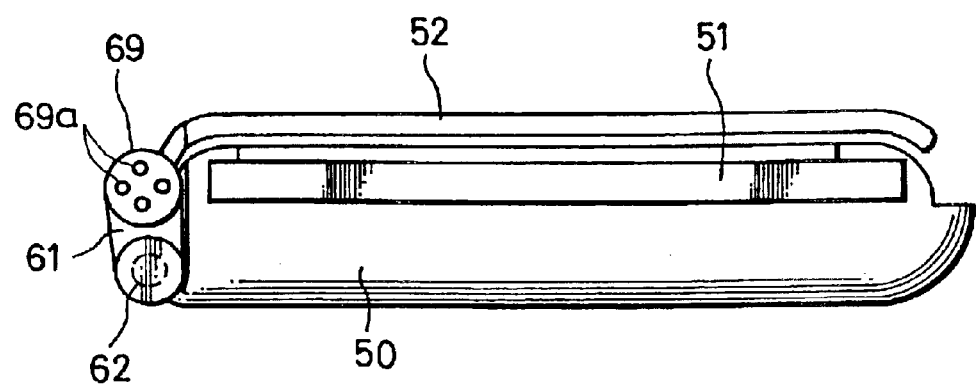
FIG. 26A is a side view of an electronic device according to a fourth embodiment of the present invention, wherein a cover is closed.

FIG. 26A shows further embodiment in which a clicking plate 69 is provided as resisting means instead of one of the above two spring pins, for example, the spring pin 63. In the control device 2 shown in this embodiment, the angle of the cover 52 to the display surface of the cabinet 50 may be selected from a plurality of stages at a predetermined angle (four stages by 90 degrees in the present embodiment). Here, both of the frictional force of the clicking plate 69 and that of the spring pin 63 may be set to have the same magnitude or to have different magnitudes.

Figure 26B:
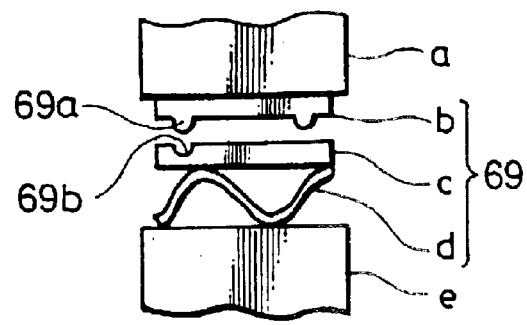
FIG. 26B is an explanatory view of a clicking circular plate in the electronic device according to the fourth embodiment of the present invention, wherein the plate is enlarged and exploded.

FIG. 26B shows an exploded and enlarged view of the clicking circular plate 69 shown in FIG. 26A. A clicking convex circular plate b is fixed to the base of the cover 52 with fixing means such as adhesives. On the clicking convex circular plate b, four convex portions 69a with the same radius are disposed at equal intervals in the circumferential direction. A clicking concave circular plate c is set to oppose to the clicking convex circular plate b.

One concave portion 69b is provided on one surface of the clicking concave circular plate c such that the portion 69b is disposed with the same radius as the four convex portions 69a to engage with or separate from each convex portion 69a. On the other surface of the clicking concave circular plate c, one surface of a corrugated plate spring d with a ring shape is fixed by fixing means such as welding. The other surface of the corrugated plate spring d is fixed on the base e of the connection block 61 with fixing means such as adhesives.

Thus, the clicking circular plate 69 has a multilayer structure comprising the clicking convex circular plate b, the clicking concave circular plate c and the corrugated plate spring d. The clicking circular plate 69 is located between the base a of the cover 52 and the base e of the connection block 61.

Accordingly, when the cover 52 is pivoted, any one of four convex portions 69a on the clicking convex circular plate b protrudes from the concave portion 69b of the clicking concave circular plate c, whereby a frictional force is generated by the elasticity of the corrugated plate spring d until the other adjacent convex portion 69a engages with the portion 69b. The cover 52 is held at an arbitrary angle to the display surface of the cabinet 50 by the above frictional force.

Further, the cover 52 is locked at a predetermined angle with respect to the display surface of the cabinet 50 by engaging the convex portion 69a on the clicking convex circular plate b with the concave portion 69b on the clicking concave circular plate c. Thereafter, when the cover 52 is pivoted, click feeling is obtained by extracting the convex portion 69a from the concave portion 69b as the cover 52 is pivoted. Thus, change in the angle of the cover 52 is reliably detected by the touch, according to the click feeling at insertion of the convex portion 69a with respect to the concave portion 69b.

FIG. 27A shows further embodiment in which the clicking positions are set at two positions on the above-described clicking plate 69, and also the clicking plate 69 is provided on the first pivoting shaft and the spring pin 63 is provided on the second pivoting shaft. On the clicking plate 69, two convex portions 69a with the same radius are arranged in the circumferential direction at equal intervals. Note that the structure of the clicking concave circular plate c and that of the corrugated plate spring d are similar to those of the above described embodiments.

In this case, both the frictional force of the clicking plate 69 and that of the spring pin 63 may be set to have the same magnitude or to have different magnitudes. In this embodiment, the frictional force of the clicking plate 69 is set to be larger than that of the spring pin 63.

As shown in FIG. 27B, when the cover 52 is opened, the second pivoting shaft with a smaller frictional force is first pivoted, and secondly the first pivoting shaft with a larger frictional force is pivoted. When a pulling-up force is applied to the free end of the cover 52, the cover 52 is opened at an angle of slightly over 180 degrees with respect to the display surface of the cabinet 50 with the spring pin 63 of the second pivoting shaft being a pivoting center. At this time, a frictional force is generated between the spring pin 63 and the connection block 61, and the cover 52 is pivoted with a frictional force caused by the elasticity of the spring pin 63.

Subsequently, as shown in FIG. 27C, when the cover 52 is further opened, the clicking plate 69 and the connection block 61 are pivoted by 180 degrees with the clicking plate 69 of the first pivoting shaft being a pivoting center. Accordingly, the cover 52 is opened by 360 degrees with respect to the display surface of the cabinet 50, and the cover 52 reaches the rear of the cabinet 50.

At this time, click feeling is obtained by operating the clicking plate at the beginning of pivoting and at the termination of pivoting, and during pivoting the cover 52 is pivoted with a frictional force by a spring force of the corrugated plate spring d. As described above, the cover 52 is pivoted with the click feeling and the frictional force.

FIG. 28 shows another embodiment of resisting means in which loads is given to the cover 52 when the body 52 is pivoted. The resisting means described in this embodiment comprises a gear device 83 and a damper device 87. The control device 2 shown in this embodiment is provided with the gear device 83 comprising two gears 84a and 84b, and the damper device 87 as resisting means, instead of one of the above-described two spring pins, for example, the spring pin 62.

A rotating shaft 85 is provided as a first pivoting shaft in the control device 2, and the connection block 61 is fixed in the middle of the rotating shaft 85 in the axial direction. One end of the rotating shaft 85 is protruding sideways, passing through the cabinet 50, and a smaller-diameter gear 84a is fixed to the protruding unit. A larger-diameter gear 84b is engaged with the smaller-diameter gear 84a, and a shaft 88 protruding to one side is provided in the larger-diameter gear 84b.

The shaft 88 of the larger-diameter gear 84b is pivotally passed through the side surface of the cabinet 50. And, the tip of the shaft 88 is inserted into the damper device 87 contained in the cabinet 50. A resisting force such as an adhesive force, a frictional force or the like is given by the damper device 87 when the shaft 88 is pivoted, and as the device 87, for example, a liquid damper utilizing liquid or other types of damper devices may be used. 86 is a gearbox which covers the larger and smaller gears 84a and 84b.

In this embodiment, when the cover 52 is pulled up and the connection block 61 is pivoted, the rotation shaft 85 and the smaller-diameter gear 84a are rotated integrally with the connection block 61. Since the larger-diameter gear 84b is constantly engaged with the smaller-diameter gear 84a, the shaft 88 is pivoted by an amount corresponding to the reduction ratio between the gears 84a and 84b. A resisting force is generated in the damper device 87 according to the pivoting amount of the shaft 88, and the connection block 61 is pivoted with respect to the cabinet 50 according to the above resisting force. Accordingly, the cover 52 may be pivoted in a smooth way with an adequate resisting force, and also the cover 52 may be reliably fixed at an arbitrary position in the middle of the pivoting.

Figure 34:
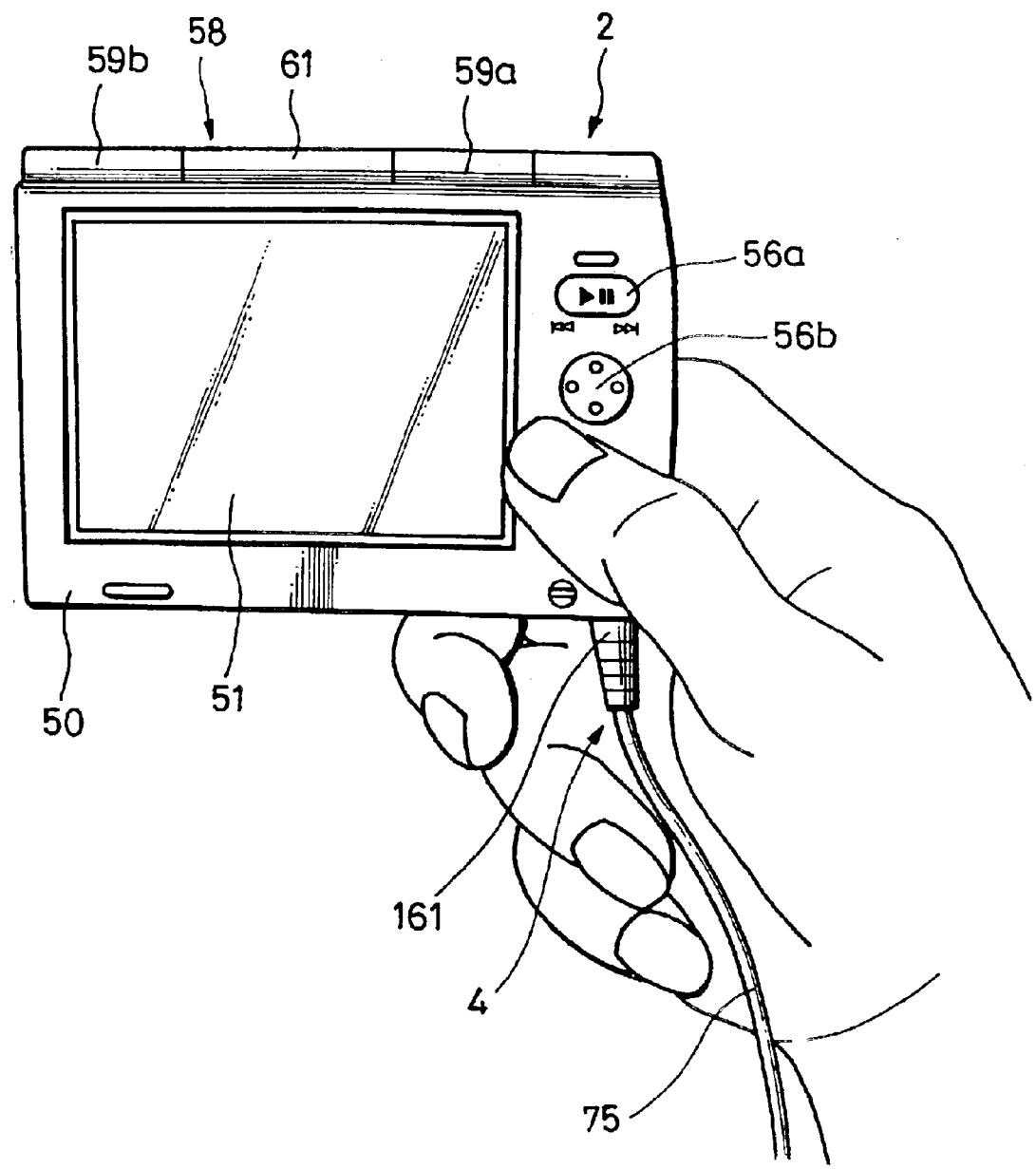
FIG. 34 is an explanatory view showing a state in which the electronic device shown in FIG. 1 according to the first embodiment is used.
Figure 35:
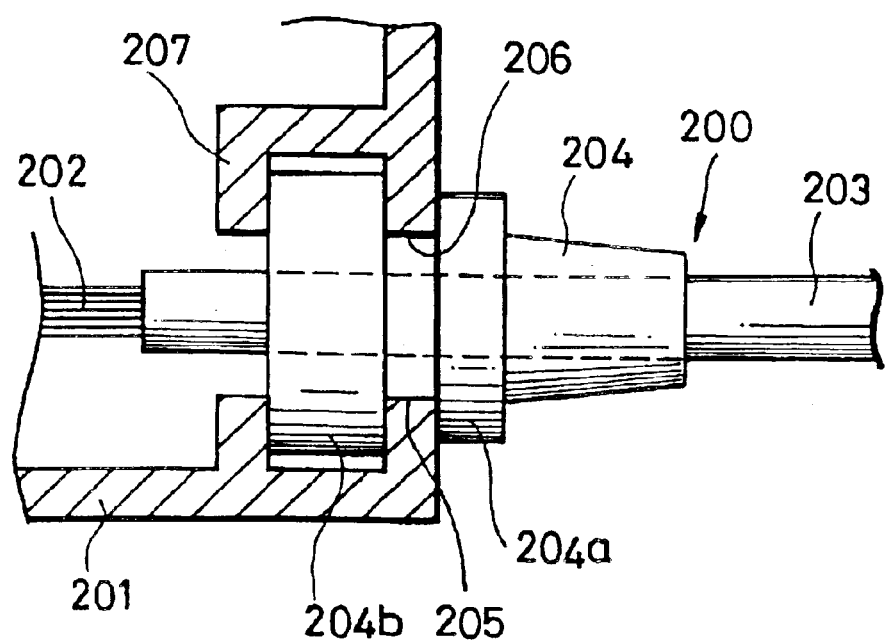
FIG. 35 is an explanatory sectional view showing a supported state of the connection cable of a conventional electronic device.

Further, as shown in FIG. 34, the control device 2 is configured such that the operation button 56a, selection button 56b, and other buttons are operated by user's hand, while the device is being held by the same one hand. In this case, the connection cable is pivoted through the pivoting unit to change the pulling-out direction of the cover 75, in which a number of wire rods are inserted, from the right side of the second side surface to the bottom side of the first side surface.

At this time, the connection cable 4 is pivotally connected to the cabinet 50 through the pivot-supporting unit 160 (or 180), and the lead-out direction can be changed from a sideways direction to a downward direction of the cabinet 50 within a range of approximately 90 degrees.

The lead-out direction of the connection cable 4 is required to be lateral when the control device 2 is mounted on a mounting surface of a plane P such as a desktop. However, if the control device 2 is held by a hand as it is, the connection cable 4 becomes an obstacle to the user as it is difficult to carry the device and operate operation button 56a and the like.

On the other hand, if the lead-out direction of the connection cable 4 is set downward as shown in FIG. 34, the control device 2 may be held by a hand without difficulties, as the connection cable 4 does not become an obstacle but extends in the direction along the user's hand to the arm. Moreover, although the operation button 56a and the like are usually operated by a thumb, the connection cable 4 does not extend in the direction of the movement of user's thumb at the operation of the operation button 56a and the like. Therefore, the connection cable does not become an obstacle and the operation button 56a and the like are easily operated by one hand.

The control device 2 with the above configuration is not limited to the use for the DVD player 1 in the above embodiments, but it is also preferably used for PDA (Personal Digital Assistants), a small-type word processor, a small-type microcomputer, an electronic dictionary, a portable television set, a small electronic clock, and the like, for example. Further, the control device 2 with the above configuration may be also applied to desktop-type devices of the above-listed electronic equipment, and other electronic devices.

Figure 18:
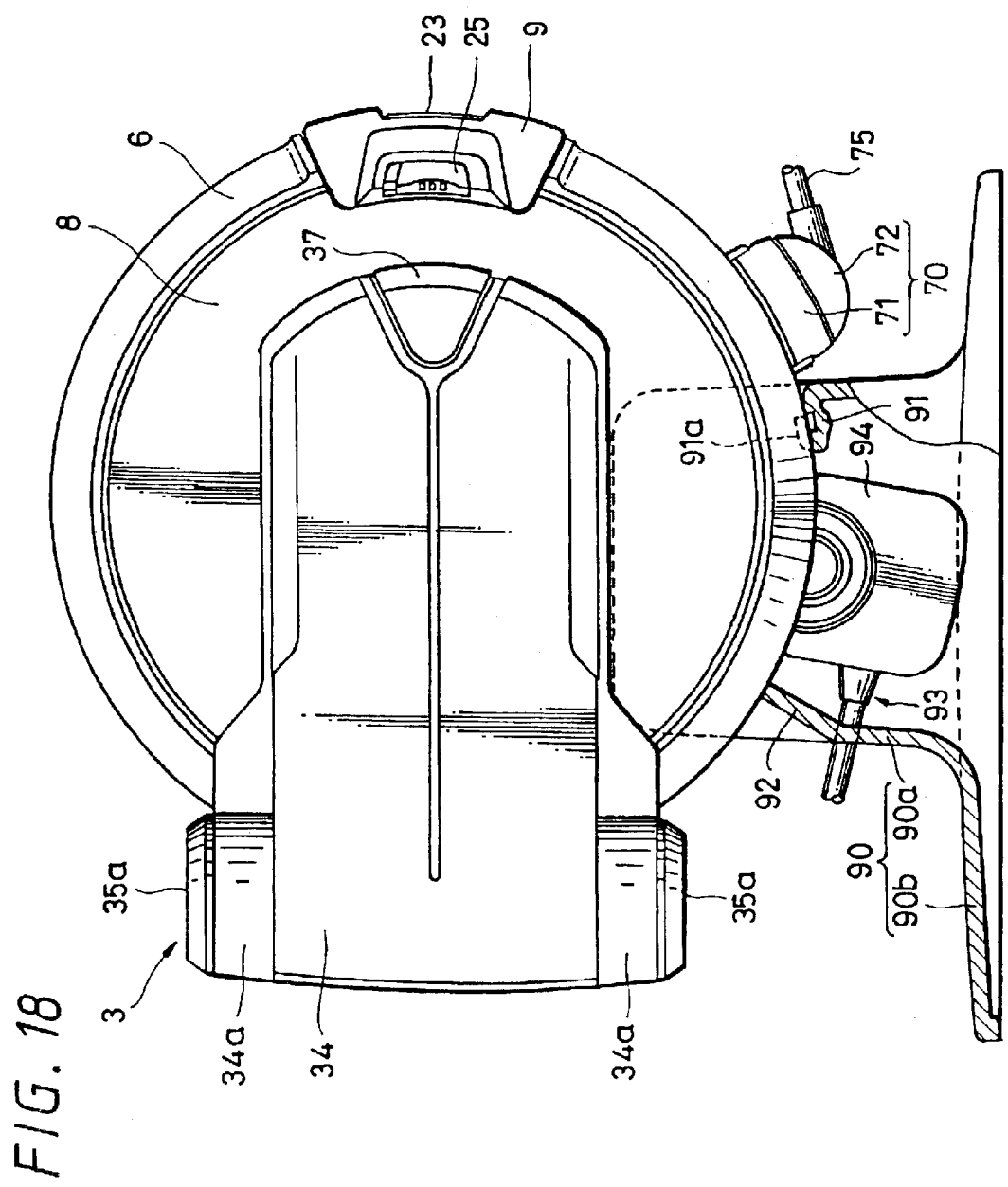
FIG. 18 is an explanatory cutaway view of a part of a holding stand in a state of electric power being charged into the DVD player shown in FIG. 2.

Further, FIG. 18 shows a state in which the DVD player 1 is connected to a domestic power supply or the like which is not shown in the figure to charge the battery housing 3 of a power-supply device. In FIG. 18, a numeral 90 represents a holding stand to keep and hold the player main unit 6. The holding stand 90 comprises a holding portion 90a in which holding grooves are formed on the upper surface and a holding platform 90b which is continuing to the lower part of the holding portion 90a. The holding platform 90b of the holding stand 90 is extended and widely formed such that a sufficiently large mounting surface is secured.

Furthermore, supporting pieces 91 and 92 which support the side surface of the player main unit 6 are provided at both sides of the holding portion 90a in the direction of the holding grooves. A pawl portion 91a which is engaged with a concave part provided on the side surface of the player main unit 6 is provided on the tip of the supporting piece 91. By providing the pawl portion 91a, it becomes possible to securely hold the DVD player 1, in which weight distribution has been ill-balanced in the circumferential direction according to the installed battery housing 3, without rolling even in a state in which the battery housing 3 is turned sideways.

Here, a numeral 93 indicated in FIG. 18 represents a third connection cable connecting a power supply such as a domestic socket to the player main unit 6. A charging plug 94 is fitted to one end of the connection cable 93. The charging plug 94 is made to be detachable with respect to the second socket unit 29 of the player main unit 6. By pressing a semicircle part at the center of the charging plug 94, a terminal portion is moved backward to release connection to the second socket unit 29.

The description has been made as described above, however, the present invention is not limited to the above embodiments. In those embodiments, a DVD player 1 is used as the information reproduction system and the remote control device 2 with a liquid crystal display is provided as an electronic device thereof. However, needless to say, devices such as a portable CD player, a portable disc drive device or other devices may also be applied as the information reproduction system, and the control devices thereof are used as the electronic devices.

Moreover, in the above-described embodiments, the present invention has been applied to information reproduction system which performs only reproduction on information signals. However, needless to say, the present invention may be applied to an information recording and/or reproduction system which may record new information signals as well as reproduce information signals, and also applied to information recording system only for recording information signals.

Moreover, in the above embodiments, there have been described examples in which the player main unit 6 and the control device 2 are connected to each other by wire, but needless to say, wireless means may be configured to be applied as signal transmission means, wherein the player main unit 6 and the control device 2 are connected to each other by radio for sending/receiving signals.

Moreover, though embodiments in which an optical disc is used as an information storage medium are described, a tape-type recording medium, a drum-type recording medium, a semiconductor storage medium, and the like may also be used as the information storage medium.

Thus, various modifications may be applied without departing from the true spirit and scope of the invention.

Industrial Applicability

According to the electronic device of the present application, the connection cable led to the outside through the opening of the housing is configured to be supported in a pivotable manner with respect to the housing, whereby the lead-out direction of the connection cable may be changed to an arbitrary position corresponding to the state of use regarding the electronic device. Accordingly, the connection cable led out from the housing may not become an obstacle to the user to operate the electronic device, which improves the convenience with respect to such electronic devices.

Further, according to the information reproduction system of the present application, the system can be used indoors, and also preferably used outdoors, as the player main unit is carried outdoors by hanging it from the neck of the user with a strap or the like and the control device is operated being held by one hand of the user. Therefore, video and audio information recorded on an optical disc may be easily enjoyed with a liquid crystal display, earphones, and the like.

What is claimed is:

1. An electronic device comprising:
   a cabinet in which an electronic circuit is contained;
   a covering member containing wire rods connected to said electronic circuit and led to an exterior of said cabinet through an opening in said cabinet;
   a pivoting shaft portion provided on said covering member; and
   a shaft receiving portion provided in said cabinet for pivotally supporting said pivoting shaft portion, wherein
   said covering member is pivotally supported with respect to said cabinet by cooperation between said pivoting shaft portion and said shaft receiving portion.

2. The electronic device according to claim 1, wherein
   said pivoting shaft portion comprises a pair of receiving holes respectively arranged at both ends of said pivoting shaft portion in a direction intersecting with a extending direction of said wire rods in said covering member, and
   said shaft receiving portion comprises a pair of tubular protruding portions provided in said housing and pivotally engaged with said pair of receiving holes, respectively.

3. The electronic device according to claim 1, further comprising:
   a remote control unit for sending a remote control signal through the wire rods to an information reproducing device connected by said wire rods; and a display unit mounted in said housing and receiving through said wire rods a reproduction signal reproduced by said information reproducing device according to said remote control signal and for displaying the reproduction signal as a picture, wherein a pivoting unit including said pivoting shaft portion and said shaft receiving portion is provided in a corner of a first side surface of said housing, and when said electronic device is held by a user said covering member is led out in a direction extending along a hand and an arm of the user by pivoting said covering member to a side of said first side surface through said pivoting unit.

4. The electronic device according to claim 1, further comprising:

a remote control unit for sending a remote control signal through said wire rods to an information reproducing device connected by said wire rods;

a display unit receiving through said wire rods a reproduction signal reproduced by said information reproducing device according to said remote control signal and for displaying the reproduction signal as a picture; and a stand provided such that said display unit is supported at a predetermined angle with respect to a mounting surface on which said electronic device is mounted, wherein when said electronic device is mounted on said mounting surface with said stand, a pivoting unit including said pivoting shaft portion and said shaft receiving portion is provided in a corner of a first side surface of said housing that is in contact with the mounting surface, when said electronic device is mounted on said mounting surface with said stand, said covering member is pivoted through said pivoting unit to a side of a second side surface intersecting with said first side surface, and when said electronic device is held by a user, a lead-out direction of said covering member with respect to said housing is changed by pivoting said covering member to a side of said first side surface through said pivoting unit.

5. An electronic device comprising:

a cabinet in which an electronic circuit is contained;

a covering member containing wire rods connected to said electronic circuit and led to an exterior of said cabinet through an opening in said cabinet;

a pivoting shaft portion having a spherical body provided on said covering member; and a spherical body receiving portion provided in said cabinet for pivotally supporting said spherical body, wherein said covering member is pivotally supported with respect to said cabinet by cooperation between said spherical body and said spherical body receiving portion.

6. A player unit comprising:

an electronic device including, a cabinet in which an electronic circuit is contained, a covering member containing wire rods connected to said electronic circuit and led to an exterior of said cabinet through an opening in said cabinet, a pivoting shaft portion provided on said covering member, and a shaft receiving portion provided in said cabinet for supporting said pivoting shaft portion; and an information reproducing device connected to said electronic device through said wire rods, wherein said covering member is pivotally supported with respect to said cabinet by cooperation between said pivoting shaft portion and said shaft receiving portion.

* * * * *

UNITED STATES PATENT AND TRADEMARK OFFICE
CERTIFICATE OF CORRECTION

PATENT NO. : 6,903,273 B2
DATED : June 7, 2005
INVENTOR(S) : Yano et al.

It is certified that error appears in the above-identified patent and that said Letters Patent is hereby corrected as shown below:

<u>Tile page,</u>
Insert Item -- [30] Foreign Application Priority Data
        Japan   2001-083321   March 22, 2001
        Japan   2001-197543   June 28, 2001
        Japan   2001-214552   July 13, 2001 --.

Signed and Sealed this

Sixth Day of June, 2006

JON W. DUDAS
*Director of the United States Patent and Trademark Office*